US012605794B2

(12) United States Patent
Kaneko et al.

(10) Patent No.: US 12,605,794 B2
(45) Date of Patent: Apr. 21, 2026

(54) FLUX AND SOLDER PASTE

(71) Applicant: SENJU METAL INDUSTRY CO., LTD., Tokyo (JP)

(72) Inventors: Mutsuki Kaneko, Tokyo (JP); Ryuichi Tsuda, Tokyo (JP); Kazuyori Takagi, Tokyo (JP)

(73) Assignee: SENJU METAL INDUSTRY CO., LTD., Adachi-ku (JP)

( * ) Notice: Subject to any disclaimer, the term of this patent is extended or adjusted under 35 U.S.C. 154(b) by 564 days.

(21) Appl. No.: 18/117,028

(22) Filed: Mar. 3, 2023

(65) Prior Publication Data

US 2023/0302586 A1 Sep. 28, 2023

(30) Foreign Application Priority Data

Mar. 7, 2022 (JP) ................................ 2022-034818

(51) Int. Cl.

*B23K 35/362* (2006.01)
*B23K 35/02* (2006.01)
*B23K 35/36* (2006.01)

(52) U.S. Cl.

CPC .......... *B23K 35/362* (2013.01); *B23K 35/025* (2013.01); *B23K 35/3613* (2013.01)

(58) Field of Classification Search

CPC B23K 35/362; B23K 35/025; B23K 35/3613; C08L 33/02; C08L 23/0869; C08L 93/04

See application file for complete search history.

(56) References Cited

U.S. PATENT DOCUMENTS

2015/0075676 A1* 3/2015 Funakoshi .............. C08L 93/04 148/23
2020/0047291 A1* 2/2020 Shiratori ............ B23K 35/3618

FOREIGN PATENT DOCUMENTS

| | | | |
|---|---|---|---|
| CN | 102770232 | A | 11/2012 |
| CN | 104070306 | A | 10/2014 |
| JP | 09-122975 | | 5/1997 |
| JP | H09122975 | A * | 5/1997 |
| JP | 2001-334394 | | 12/2001 |
| JP | 2007-069259 | A | 3/2007 |
| JP | 6544498 | | 7/2019 |
| JP | 6575713 | A | 9/2019 |
| JP | 6575713 | B | 9/2019 |
| JP | 2020-040095 | A | 3/2020 |

(Continued)

OTHER PUBLICATIONS

JP-H09122975-A: Espacenet English machine translation (Year: 1997).*

(Continued)

*Primary Examiner* — Adil A. Siddiqui

(74) *Attorney, Agent, or Firm* — NIXON PEABODY LLP; Jeffrey L. Costellia

(57) ABSTRACT

The present invention employs a flux containing a resin component, an activator, and a solvent. The resin component contains a copolymer (A) having an alkene-derived repeating unit (a1), and an acrylic acid-derived repeating unit (a2) in which a hydrogen atom bonded to a carbon atom at an α-position may be substituted with a substituent, and contains a rosin (B). A mixing ratio of the copolymer (A) and the rosin (B) is 1 or more as a mass ratio represented by copolymer (A)/rosin (B).

12 Claims, 1 Drawing Sheet

(56) References Cited

FOREIGN PATENT DOCUMENTS

| | | | |
|---|---|---|---|
| WO | WO-2013/108663 | | 7/2013 |
| WO | 2020-241544 | A1 | 12/2020 |

OTHER PUBLICATIONS

European Search Report for European Patent Application No. 23766649.0, mailed Mar. 28, 2025, (5 pages).
Chinese Office Action (Application No. 202380022563.8) mailed Jan. 1, 2025, 17 pages.
Korean Notice of Allowance (Application 10-2024-7029060) mailed Jan. 15, 2025, 5 pages.
Japanese Office Action for Application No. 2022-034818, mailed Apr. 5, 2022 (5 pages).

* cited by examiner

FLUX AND SOLDER PASTE

CROSS-REFERENCE TO RELATED APPLICATION

Priority is claimed on Japanese Patent Application No. 2022-034818, filed Mar. 7, 2022, the content of which is incorporated herein by reference.

BACKGROUND OF THE INVENTION

Field of the Invention

The present invention relates to a flux and a solder paste.

Description of Related Art

Fixing of components to a board and electrical connection of components to a board are generally performed by soldering. In soldering, fluxes, solder powders, and solder pastes in which a flux and a solder powder are mixed are used.

A flux has the effect of chemically removing metal oxides present on the metal surface of an object to be joined, which is a soldering target, and on a solder, thereby enabling the movement of metal elements at the boundary between the metal surface of the object to be joined and the solder. Therefore, by performing soldering using the flux, an intermetallic compound is formed between the metal surface of the object to be joined and the solder. Thereby, strong joining can be obtained.

In soldering using a solder paste, the solder paste is first printed on a board, and thereafter components are mounted to heat the board on which the components are mounted in a heating furnace called a reflow furnace. This melts a solder powder contained in the solder paste, and the components are soldered to the board. Thereby, a joined body is obtained.

A flux generally contains a resin component, a solvent, an activator, a thixotropic agent, and the like.

The resin component contained in the flux applied onto a board may remain as a flux residue in a joined body. The flux residue may crack due to a temperature rise caused by the operation of a device having a joined body, or due to a rise or fall in outside air temperature.

In this regard, for example, Japanese Patent No. 6544498 proposes an acrylic resin-containing flux that contains a rosin, a thixotropic agent, and a solvent, and can reduce cracking of a flux residue due to temperature changes.

PATENT DOCUMENTS

[Patent Document 1]
Japanese Patent, Publication No. 6544498

SUMMARY OF THE INVENTION

According to the flux disclosed in Japanese Patent No. 6544498, cracking of a flux residue due to temperature changes can be reduced. Furthermore, in a solder paste formed using the flux disclosed in Japanese Patent No. 6544498, separation into a solder powder and the flux over time at the time of storage can be prevented.

Meanwhile, in soldering of ball grid arrays and chip components, joint portions are sometimes filled with an underfill to improve soldering strength, vibration resistance, thermal shock resistance, and the like. The inventors of the present invention have found that when the flux and an underfill disclosed in Japanese Patent No. 6544498 are used, soldering strength is decreased due to the thixotropic agent contained in the flux.

Therefore, an object of the present invention is to provide a flux and a solder paste which can reduce the cracking of a flux residue due to temperature changes, prevent the separation of the solder paste into a solder powder and the flux over time at the time of storage, and prevent a decrease in soldering strength when an underfill is used.

The inventors of the present invention have found that even when a flux does not contain a thixotropic agent, when the flux contains a copolymer having a repeating unit derived from acrylic acid, separation of a solder paste into a solder powder and the flux over time can be prevented at the time of storage. Thereby, the present invention has been completed.

The present invention includes the following aspects.

[1] A flux containing: a resin component; an activator; and a solvent, in which the resin component contains a copolymer (A) having an alkene-derived repeating unit (a1), and an acrylic acid-derived repeating unit (a2) in which a hydrogen atom bonded to a carbon atom at an α-position may be substituted with a substituent, and contains a rosin (B), and in which a mixing ratio of the copolymer (A) and the rosin (B) is 1 or more as a mass ratio represented by copolymer (A)/rosin (B).

[2] The flux according to [1], in which a content of the repeating unit (a2) in the copolymer (A) is 3% by mass or more with respect to a total mass of the copolymer (A).

[3] The flux according to [1] or [2], in which a content of the copolymer (A) is 5% by mass or more and 50% by mass or less with respect to a total mass of the flux.

[4] The flux according to any one of [1] to [3], in which a content of the rosin (B) is 1% by mass or more and 20% by mass or less with respect to a total mass of the flux.

[5] The flux according to any one of [1] to [4], in which a dielectric constant of the solvent is 4 or less.

[6] The flux according to [5], in which the solvent is one or more selected from the group consisting of α-terpineol and 2-hexyl-1-decanol.

[7] The flux according to any one of [1] to [6], further containing: a compound represented by General Formula (2).

$$R^{21}—NH_2 \qquad (2)$$

[In the formula, $R^{21}$ represents an organic group.]

[8] The flux according to [7], in which the compound represented by General Formula (2) is one or more selected from the group consisting of monoethanolamine, triethylenetetramine, and dipropylenetriamine.

[9] The flux according to [7] or [8], further containing: a compound represented by General Formula (3).

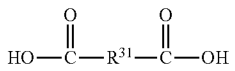

(3)

[In the formula, $R^{31}$ represents an organic group or a single bond.]

[10] The flux according to [9], in which the compound represented by General Formula (3) is one or more selected from the group consisting of malonic acid, succinic acid, glutaric acid, adipic acid, and azelaic acid.

[11] The flux according to any one of [1] to [10], further containing: a thixotropic agent, in which a content of the thixotropic agent is more than 0% by mass and equal to or less than 2% by mass with respect to a total mass of the flux.

[12] The flux according to any one of [1] to [10], in which a thixotropic agent is not contained.

[13] A solder paste containing: a solder alloy powder; and the flux according to any one of [1] to [12].

According to the present invention, it is possible to provide a flux and a solder paste which can reduce the cracking of a flux residue due to temperature changes, prevent the separation of the solder paste into a solder powder and the flux over time at the time of storage, and prevent a decrease in soldering strength when an underfill is used.

DETAILED DESCRIPTION OF THE INVENTION (Flux)

Figure 1:
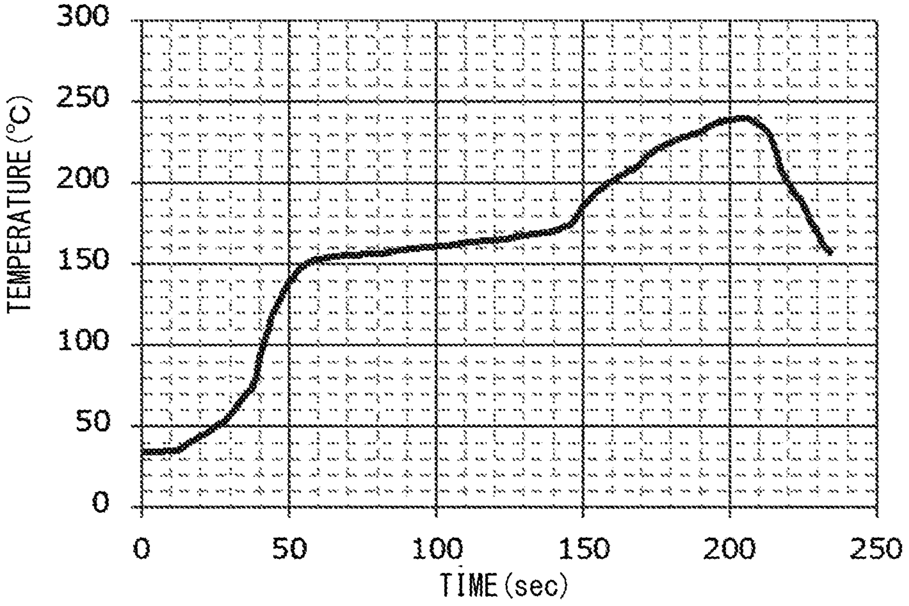
FIG. 1 is a graph showing a reflow profile for a test board production in the evaluation of temperature cycle reliability.

A flux according to the present embodiment contains a resin component, an activator, and a solvent.

<Resin Component>

The resin component contains a copolymer (A) and a rosin (B).

In the flux according to the present embodiment, the mixing ratio of the copolymer (A) and the rosin (B) is 1 or more as the mass ratio represented by the copolymer (A)/rosin (B), that is, the ratio of the total mass of the copolymer (A) to the total mass of the rosin (B).

<<Copolymer (A)>>

The copolymer (A) has an alkene-derived repeating unit (a1), and an acrylic acid-derived repeating unit (a2) in which a hydrogen atom bonded to a carbon atom at an α-position may be substituted with a substituent. The copolymer (A) may have a repeating unit (a3) other than the repeating unit (at) and the repeating unit (a2).

[Repeating Unit (a1)]

The repeating unit (a1) is derived from an alkene.

Examples of the alkene include a compound represented by $C_nH_{2n}$. Herein, n is an integer of 2 or more, preferably 2 or more and 10 or less, more preferably 2 or more and 6 or less, further preferably 2 or more and 3 or less, and particularly preferably 2.

Examples of the compound represented by $C_nH_{2n}$ include ethylene, propylene, isobutene, 1-butene, 1-pentene, and 1-hexene. One or more selected from the group consisting of ethylene and propylene are preferable, among which ethylene is more preferable.

Examples of the alkene from which the repeating unit (a1) is derived further include 1,3-butadiene and 2-methyl-1,3-butadiene.

The repeating unit (a1) contained in the copolymer (A) may be of one type or two or more types.

[Repeating Unit (a2)]

The repeating unit (a2) is derived from acrylic acid. In the repeating unit (a2), the hydrogen atom bonded to the carbon atom at the α-position may be substituted with a substituent. When the carbon atom at the α-position has a substituent, examples of the above-mentioned substituent include a chain or branched alkyl group. The number of carbon atoms in the above-mentioned alkyl group is preferably 1 to 5.

Examples of the repeating unit (a2) include a repeating unit derived from acrylic acid and a repeating unit derived from methacrylic acid.

The repeating unit (a2) contained in the copolymer (A) may be of one type or two or more types.

[Repeating Unit (a3)]

The repeating unit (a3) is a repeating unit other than the repeating unit (a1) and the repeating unit (a2).

Examples of the repeating unit (a3) include a repeating unit derived from an acrylic acid ester (hereinafter sometimes referred to as "(α-substituted) acrylic acid ester") in which a hydrogen atom bonded to a carbon atom at an α-position may be substituted with a substituent, a repeating unit derived from an alkylene oxide, and a repeating unit having an aromatic group.

The (α-substituted) acrylic acid ester means one or both of an acrylic acid ester and an acrylic acid ester in which a hydrogen atom bonded to a carbon atom at an α-position may be substituted with a substituent. Examples of the above-mentioned substituent include an alkyl group having 1 to 5 carbon atoms.

The (α-substituted) acrylic acid ester is a reaction product of an (α-substituted) acrylic acid and an alcohol. Examples of the alcohol include an alcohol having 1 to 24 carbon atoms and having a linear carbon chain.

The (α-substituted) acrylic acid means one or both of an acrylic acid and an acrylic acid in which a hydrogen atom bonded to a carbon atom at an α-position is substituted with a substituent. Examples of the above-mentioned substituent include an alkyl group having 1 to 5 carbon atoms.

Examples of the (α-substituted) acrylic acid ester include acrylic acid esters such as methyl acrylate, ethyl acrylate, propyl acrylate, n-butyl acrylate, t-butyl acrylate, cyclohexyl acrylate, octyl acrylate, nonyl acrylate, hydroxyethyl acrylate, hydroxypropyl acrylate, benzyl acrylate, anthracene acrylate, glycidyl acrylate, 3,4-epoxycyclohexylmethane acrylate, and propyltrimethoxysilane acrylate; and methacrylic acid esters such as methyl methacrylate, ethyl methacrylate, propyl methacrylate, n-butyl methacrylate, t-butyl methacrylate, cyclohexyl methacrylate, octyl methacrylate, nonyl methacrylate, hydroxyethyl methacrylate, hydroxypropyl methacrylate, benzyl methacrylate, anthracene methacrylate, glycidyl methacrylate, 3,4-epoxycyclohexylmethane methacrylate, and propyltrimethoxysilane methacrylate.

Among these, methyl acrylate, ethyl acrylate, t-butyl acrylate, methyl methacrylate, ethyl methacrylate, and t-butyl methacrylate are preferable.

Examples of the alkylene oxide include ethylene oxides, propylene oxides, isopropylene oxides, and butylene oxides.

Examples of the repeating unit having an aromatic group include a repeating unit having an aromatic group such as a phenyl group and a naphthyl group. Examples of the repeating unit having a phenyl group include a repeating unit derived from styrene or its derivatives.

When the copolymer (A) has the repeating unit (a3), the repeating unit (a3) of the copolymer (A) may be of one type or two or more types.

In the copolymer (A), the content of the repeating unit (a1) is preferably 10% by mass or more, more preferably 40% by mass or more, and further preferably 65% by mass or more with respect to the total mass (100% by mass) of the copolymer (A).

The content of the repeating unit (a1) is preferably 98% by mass or less, more preferably 97% by mass or less, and further preferably 95% by mass or less with respect to the total mass (100% by mass) of the copolymer (A).

When the content of the repeating unit (a1) is equal to or more than the above-mentioned lower limit value, the electrical reliability of a joined body is easily improved.

When the content of the repeating unit (a1) is equal to or less than the above-mentioned upper limit value, the separation of a solder paste into a solder powder and the flux over time is easily prevented. In addition, cracking of a flux residue due to temperature changes is easily reduced. Furthermore, solderability can be easily improved. Furthermore, the solubility of the copolymer (A) in the flux is easily improved.

In the copolymer (A), the content of the repeating unit (a1) is preferably 10% by mass or more and 98% by mass or less, more preferably 40% by mass or more and 97% by mass or less, and further preferably 65% by mass or more and 95% by mass or less with respect to the total mass (100% by mass) of the copolymer (A).

When the content of the repeating unit (a1) is equal to or more than the above-mentioned lower limit value of the preferable range, the electrical reliability of a joined body is easily improved. When the content of the repeating unit (a1) is equal to or less than the above-mentioned upper limit value of the preferable range, the separation of a solder paste into a solder powder and the flux over time is easily prevented. In addition, cracking of a flux residue due to temperature changes is easily reduced. Furthermore, solderability can be easily improved. Furthermore, the solubility of the copolymer (A) in the flux is easily improved.

In the copolymer (A), the content of the repeating unit (a2) is preferably 2% by mass or more, more preferably 3% by mass or more, and further preferably 5% by mass or more with respect to the total mass (100% by mass) of the copolymer (A).

The content of the repeating unit (a2) is preferably 90% by mass or less, more preferably 60% by mass or less, and further preferably 35% by mass or less with respect to the total mass (100% by mass) of the copolymer (A).

When the content of the repeating unit (a2) is equal to or more than the above-mentioned lower limit value, the separation of a solder paste into a solder powder and the flux over time is easily prevented. In addition, cracking of a flux residue due to temperature changes is easily reduced. Furthermore, solderability can be easily improved. Furthermore, the solubility of the copolymer (A) in the flux is easily improved.

When the content of the repeating unit (a2) is equal to or less than the above-mentioned upper limit value, the electrical reliability of a joined body is easily improved.

The content of the repeating unit (a2) is preferably 2% by mass or more and 90% by mass or less, more preferably 3% by mass or more and 60% by mass or less, and further preferably 5% by mass or more and 35% by mass or less with respect to the total mass of the copolymer (A).

When the content of the repeating unit (a2) is equal to or more than the above-mentioned lower limit value of the preferable range, the separation of a solder paste into a solder powder and the flux over time is easily prevented. In addition, cracking of a flux residue due to temperature changes is easily reduced. Furthermore, solderability can be easily improved. Furthermore, the solubility of the copolymer (A) in the flux is easily improved.

When the content of the repeating unit (a2) is equal to or less than the above-mentioned upper limit value of the preferable range, the electrical reliability of a joined body is easily improved.

When the copolymer (A) has the repeating unit (a3), the content of the repeating unit (a3) in the copolymer (A) is preferably 30% by mass or less, more preferably 20% by mass or less, and further preferably 10% by mass or less with respect to the total mass (100% by mass) of the copolymer (A).

When the copolymer (A) has the repeating unit (a3), the lower limit value of the content of the repeating unit (a3) in the copolymer (A) is not particularly limited as long as the effects of the present invention are exhibited, and the lower limit value may be, for example, 0.1% by mass with respect to the total mass (100% by mass) of the copolymer (A).

When the copolymer (A) has the repeating unit (a3), the content of the repeating unit (a3) in the copolymer (A) is preferably 0.1% by mass or more and 30% by mass or less, more preferably 0.1% by mass or more and 20% by mass or less, and further preferably 0.1% by mass or more and 10% by mass or less with respect to the total mass (100% by mass) of the copolymer (A).

The copolymer (A) may be a random copolymer or may be a block copolymer.

Herein, in the copolymer (A), the repetition number of the repeating unit (a1) is defined as m, and the repetition number of the repeating unit (a2) is defined as n. The molecular weight of the repeating unit (a1) is defined as M1, and the molecular weight of the repeating unit (a2) is defined as M2. An acid value is defined as P. The content of the repeating unit (a2) with respect to the total mass (100% by mass) of the copolymer (A) is defined as W % by mass. The formula weight of potassium hydroxide is set to 56. In this case, the following relational expressions are established.

$$W=\{n\times M2/(m\times M1+n\times M2)\}\times 100$$

$$P/56=(1000\times W/100)/M2$$

$$m/n=\{(100\times 560/P)-M2\}/M1$$

The copolymer (A) contained in the flux according to the present embodiment preferably has a structure represented by General Formula (1).

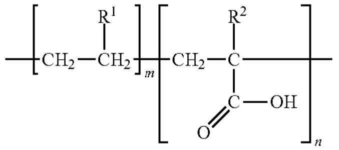

(1)

[In the formula, $R^1$ represents a hydrogen atom or a methyl group; $R^2$ represents a hydrogen atom or a methyl group; and in and n each represent an integer of 1 or more.]

The acid value of the copolymer (A) is preferably 20 or higher, more preferably 30 or higher, and further preferably 40 or higher. The above-mentioned acid value is preferably 360 or lower, more preferably 240 or lower, and further preferably 120 or lower.

When the acid value is equal to or higher than the above-mentioned lower limit value, the separation of a solder paste into a solder powder and the flux over time is easily prevented. In addition, cracking of a flux residue due to temperature changes is easily reduced. Furthermore, solderability can be easily improved. Furthermore, the solubility of the copolymer (A) in the flux is easily improved.

When the acid value is equal to or lower than the above-mentioned upper limit value, the electrical reliability of a joined body is easily improved.

The acid value of the copolymer (A) is preferably 20 or more and 360 or less, more preferably 30 or more and 240 or less, and further preferably 40 or more and 120 or less.

When the acid value is equal to or higher than the above-mentioned lower limit value of the preferable range, the separation of a solder paste into a solder powder and the flux over time is easily prevented. In addition, cracking of a flux residue due to temperature changes is easily reduced. Furthermore, solderability can be easily improved. Furthermore, the solubility of the copolymer (A) in the flux is easily improved.

When the acid value is equal to or lower than the above-mentioned upper limit value of the preferable range, the electrical reliability of a joined body is easily improved.

In the present specification, the acid value of copolymer (A) means the number of milligrams of potassium hydroxide required to neutralize 1,000 mg of the copolymer (A).

The ratio of m to n in the copolymer (A) is preferably 0.1 or more, more preferably 1 or more, and further preferably 3 or more as m/n, that is, the ratio of the repetition number m of the repeating unit (a1) to the repetition number n of the repeating unit (a2). m/n is preferably 100 or less, more preferably 75 or less, and further preferably 50 or less.

When m/n is equal to or more than the above-mentioned lower limit value, the electrical reliability of a joined body is easily improved.

When m/n is equal to or less than the above-mentioned upper limit value, the separation of a solder paste into a solder powder and the flux over time is easily prevented. In addition, cracking of a flux residue due to temperature changes is easily reduced. Furthermore, solderability can be easily improved. Furthermore, the solubility of the copolymer (A) in the flux is easily improved.

m/n is preferably 0.1 or more and 100 or less, more preferably 1 or more and 75 or less, and further preferably 3 or more and 50 or less.

When m/n is equal to or more than the above-mentioned lower limit value of the preferable range, the electrical reliability of a joined body is improved.

When m/n is equal to or less than the above-mentioned upper limit value of the preferable range, the separation of a solder paste into a solder powder and the flux over time is easily prevented. In addition, cracking of a flux residue due to temperature changes is easily reduced. Furthermore, solderability can be easily improved. Furthermore, the solubility of the copolymer (A) in the flux is easily improved.

The weight-average molecular weight of the copolymer (A) is preferably 1,000 Mw or more and 50,000 Mw or less, more preferably 1,000 Mw or more and 20,000 Mw or less, further preferably 1,000 Mw or more and 10,000 Mw or less, and particularly preferably 2,000 Mw or more and 10,000 Mw or less.

When the above-mentioned weight-average molecular weight is equal to or more than the above-mentioned lower limit value of the preferable range, cracking of a flux residue due to temperature changes is easily reduced.

When the above-mentioned weight-average molecular weight is equal to or less than the above-mentioned upper limit of the preferable range, the viscosity of a solder paste is easily prevented from becoming too high.

In the present specification, the weight-average molecular weight is measured by gel permeation chromatography (GPC) measurement and is a molecular weight expressed in terms of polystyrene.

For the above-mentioned copolymer (A), one type may be used alone, or two or more types may be mixed and used.

The content of the copolymer (A) in the flux is preferably 10% by mass or more with respect to the total mass (100% by mass) of the flux. The content of the copolymer (A) is preferably 30% by mass or less, more preferably 25% by mass or less, and further preferably 20% by mass or less with respect to the total mass (100% by mass) of the flux.

When the content of the copolymer (A) is equal to or more than the above-mentioned lower limit value, temperature cycle reliability is easily improved. Furthermore, the separation of a solder paste into a solder powder and the flux over time is easily prevented. When the content of the copolymer (A) is equal to or less than the above-mentioned upper limit value, the viscosity of a solder paste is easily prevented from becoming too high.

The content of the copolymer (A) in the flux is preferably 10% by mass or more and 30% by mass or less, more preferably 10% by mass or more and 25% by mass or less, and further preferably 10% by mass or more and 20% by mass or less with respect to the total mass (100% by mass) of the flux.

When the content of the copolymer (A) is equal to or more than the above-mentioned lower limit value of the preferable range, temperature cycle reliability is easily improved. Furthermore, the separation of a solder paste into a solder powder and the flux over time is easily prevented. When the content of the copolymer (A) is equal to or less than the above-mentioned upper limit value of the preferable range, the viscosity of a solder paste is easily prevented from becoming too high.

<<Rosin (B)>>

The flux according to the present embodiment contains the rosin (B).

In the present invention, the term "rosin" includes natural resins containing a mixture of abietic acid and its isomer with abietic acid as a main component, and resins (sometimes referred to as rosin derivatives) which are obtained by chemically modifying natural resins.

The content of abietic acid in the natural resin is, for example, 40% by mass or more and 80% by mass or less with respect to the natural resin.

In the present specification, the term "main component" refers to a component contained in a compound by an amount of 40% by mass or more, among components constituting the compound.

Examples of typical isomers of abietic acid include neoabietic acid, palustric acid, and levopimaric acid. The structure of abietic acid is shown below.

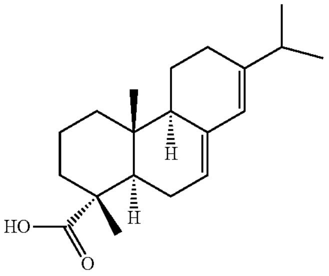

Abietic acid

Examples of the above-mentioned "natural resin" include a gum rosin, a wood rosin, and a tall oil rosin.

In the present invention, the "resins (rosin derivatives) which are obtained by chemically modifying natural resins"

include those that have been subjected to one or more treatments selected from the group consisting of hydrogenation, dehydrogenation, neutralization, alkylene oxide addition, amidation, dimerization and multimerization, esterification, and Diels-Alder cycloaddition.

Examples of the rosin derivatives include a purified rosin and a modified rosin.

Examples of the modified rosin include a hydrogenated rosin, a polymerized rosin, a polymerized hydrogenated rosin, a disproportionated rosin, an acid-modified rosin, a rosin ester, an acid-modified hydrogenated rosin, an acid anhydride-modified hydrogenated rosin, an acid-modified disproportionated rosin, an acid anhydride-modified disproportionated rosin, a phenol-modified rosin, an α,β unsaturated carboxylic acid-modified product (such as an acrylic acid-modified rosin, a maleic acid-modified rosin, and a fumaric acid-modified rosin), purified products, hydrides, and disproportionated products of the polymerized rosin, purified products, hydrides, and disproportionated products of the α,β unsaturated carboxylic acid-modified product, a rosin alcohol, a rosin amine, a hydrogenated rosin alcohol, a rosin ester, a hydrogenated rosin ester, a rosin soap, a hydrogenated rosin soap, and an acid-modified rosin soap.

Examples of the rosin amine include a dehydroabiethylamine and a dihydroabiethylamine. The rosin amine means so-called a disproportionated rosin amine. The structures of the dehydroabiethylamine and the dihydroabiethylamine are each shown below.

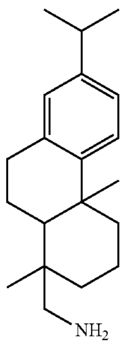

Dehydroabietylamine

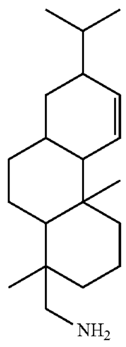

Dihydroabietylamine

For the rosin (B), one type may be used alone, or two or more types may be mixed and used.

The rosin (B) preferably includes a rosin derivative, and preferably includes one or more selected from the group consisting of an acid-modified hydrogenated rosin and a hydrogenated rosin.

The acid-modified hydrogenated rosin preferably includes a maleic acid-modified hydrogenated rosin.

The content of the rosin (B) in the flux is preferably 1% by mass or more, and more preferably 2% by mass or more with respect to the total mass (100% by mass) of the flux.

The content of the rosin (B) is preferably 10% by mass or less, more preferably 6% by mass or less, and further preferably 4% by mass or less.

When the content of the rosin (B) is equal to or more than the above-mentioned lower limit value, the oxidation of a solder powder is easily prevented. When the content of the rosin (B) is equal to or less than the above-mentioned upper limit value, temperature cycle reliability is more easily improved.

The content of the rosin (B) in the flux is preferably 1% by mass or more and 10% by mass or less, more preferably 2% by mass or more and 10% by mass or less, and further preferably 2% by mass or more and 6% by mass or less with respect to the total mass (100% by mass) of the flux.

When the content of the rosin (B) is equal to or more than the above-mentioned lower limit value of the preferable range, the oxidation of a solder powder is easily prevented. When the content of the rosin (B) is equal to or less than the above-mentioned upper limit value of the preferable range, temperature cycle reliability is more easily improved.

In the flux according to the present embodiment, the mixing ratio of the copolymer (A) and the rosin (B) is 1 or more, preferably more than 1, more preferably 2 or more, and further preferably 3 or more, as the mass ratio represented by the copolymer (A)/rosin (B), that is, the ratio of the total mass of the copolymer (A) to the total mass of the rosin (B). The above-mentioned mass ratio is preferably 30 or less, more preferably 20 or less, and further preferably 10 or less.

When the mixing ratio is equal to or more than the above-mentioned lower limit value, temperature cycle reliability is easily improved. Furthermore, a solder paste separation prevention ability is easily improved.

When the mixing ratio is equal to or less than the above-mentioned upper limit value, the viscosity of the flux is easily prevented from becoming too high.

In the flux according to the present embodiment, the mixing ratio of the copolymer (A) and the rosin (B) is preferably 1 or more and 30 or less, more preferably more than 1 and equal to or less than 20, further preferably 2 or more and 10 or less, and particularly preferably 3 or more and 10 or less.

When the mixing ratio is equal to or more than the above-mentioned lower limit value of the preferable range, temperature cycle reliability is easily improved. Furthermore, a solder paste separation prevention ability is easily improved.

When the mixing ratio is equal to or less than the above-mentioned upper limit value of the preferable range, the viscosity of the flux is easily prevented from becoming too high.

<<Other Resins>>

The flux according to the present embodiment may contain resins other than the copolymer (A) and the rosin (B) or may not contain resins other than the copolymer (A) and the rosin (B), as long as the effects of the present invention are exhibited.

Examples of the other resins include a terpene resin, a modified terpene resin, a terpene phenol resin, a modified terpene phenol resin, a styrene resin, a modified styrene resin, a xylene resin, a modified xylene resin, an acrylic resin (provided that the copolymer (A) is excluded), a polyethylene resin, an acrylic-polyethylene copolymer resin, and other thermosetting resins.

Examples of the acrylic resin (provided that the copolymer (A) is excluded) include those having the repeating unit derived from the (α-substituted) acrylic acid ester mentioned above for the copolymer (A). The acrylic resin (provided that the copolymer (A) is excluded) may have one or more selected from the group consisting of the repeating unit (a1) and the repeating unit (a3) mentioned above for the copolymer (A).

Examples of the modified terpene resin include an aromatic modified terpene resin, a hydrogenated terpene resin, and a hydrogenated aromatic modified terpene resin. Examples of the modified terpene phenol resin include a hydrogenated terpene phenol resin. Examples of the modified styrene resin include a styrene acrylic resin and a styrene maleic acid resin. Examples of the modified xylene resin include a phenol-modified xylene resin, an alkylphenol-modified xylene resin, a phenol-modified resol-type xylene resin, a polyol-modified xylene resin, and a polyoxyethylene-added xylene resin.

Examples of the other thermosetting resins include an epoxy resin.

Examples of the epoxy resin include a bisphenol A type epoxy resin, a bisphenol F type epoxy resin, a bisphenol S type epoxy resin, a glycidylamine type resin, an alicyclic epoxy resin, an aminopropane type epoxy resin, a biphenyl type epoxy resin, a naphthalene type epoxy resin, an anthracene type epoxy resin, a triazine type epoxy resin, a dicyclopentadiene type epoxy resin, a triphenylmethane type epoxy resin, a fluorene type epoxy resin, a phenol aralkyl type epoxy resin, and a novolac type epoxy resin.

When the flux according to the present embodiment contains the other resin, the content of the other resin is preferably more than 0% by mass and equal to or less than 10% by mass with respect to the total mass (100% by mass) of the flux. The upper limit value of the content of the other resin maybe 8% by mass, 6% by mass, 4% by mass, 2% by mass, 1% by mass, or 0.5% by mass with respect to the total mass (100% by mass) of the flux.

The resin component preferably consists of the copolymer (A) and the rosin (B).

The content of the resin component in the flux is preferably 5% by mass or more and 50% by mass or less, more preferably 10% by mass or more and 45% by mass or less, and further preferably 10% by mass or more and 40% by mass or less with respect to the total mass (100% by mass) of the flux.

<Activator>

The flux according to the present embodiment contains an activator.

Examples of the activator include amines, organic acids, and halogenated compounds.

<<Amines>>

Examples of the amines include rosin amines, azoles, guanidines, alkylamines, aromatic amines, aminoalcohols, and amine-polyoxyalkylene adducts. Examples of the rosin amines include those described in the examples in <Rosin>.

Examples of the azoles include 2-methylimidazole, 2-ethylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, a 2,4-diamino-6-[2'-methylimidazolyl-(1')]-ethyl-s-triazine isocyanuric acid adduct, a 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, a 2,4-diamino-6-vinyl-s-triazine isocyanuric acid adduct, 2,4-diamino-6-methacryloyloxyethyl-s-triazine, an epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 1,2,4-triazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylenebisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl]methylbenzotriazole, 2,2'-[[(methyl-1H-benzotriazol-1-yl)methyl]imino]bisethanol, 1-(1',2'-dicarboxyethyl)benzotriazole, 1-(2,3-dicarboxypropyl)benzotriazole, 1-[(2-ethylhexylamino)methyl]benzotriazole, 2,6-bis[(1H-benzotriazol-1-yl)methyl]-4-methylphenol, 5-methylbenzotriazole, 5-phenyltetrazole, and 3-(N-salicyloyl)amino-1,2,4-triazole.

Examples of the guanidines include 1,3-diphenylguanidine, 1,3-di-o-tolylguanidine, 1-o-tolylbiguanide, 1,3-di-o-cumenylguanidine, and 1,3-di-o-cumenyl-2-propionylguanidine.

Examples of the alkylamines include ethylamine, triethylamine, ethylenediamine, triethylenetetramine, cyclohexylamine, hexadecylamine, and stearylamine.

Examples of the aromatic amines include aniline, N-methylaniline, diphenylamine, N-isopropylaniline, p-isopropylaniline, meta-xylenediamine, tolylenediamine, para-xylenediamine, phenylenediamine, 4,4-diaminodiphenylmethane, and pyrimidine-2,4,5,6-tetraamine.

Examples of the aminoalcohols include alkanolamines such as 1-amino-2-propanol and N,N,N',N'-tetrakis(2-hydroxypropyl)ethylenediamine.

Examples of the amine-polyoxyalkylene adducts include diamine-terminated polyalkylene glycols, aliphatic amine-polyoxyalkylene adducts, aromatic amine-polyoxyalkylene adducts, and polyvalent amine-polyoxyalkylene adducts.

Examples of alkylene oxides added to the amine-polyoxyalkylene adducts include ethylene oxides, propylene oxides, and butylene oxides.

The diamine-terminated polyalkylene glycol is a compound in which both terminals of polyalkylene glycol are aminated.

Examples of the diamine-terminated polyalkylene glycols include diamine-terminated polyethylene glycols, diamine-terminated polypropylene glycols, and diamine-terminated polyethylene glycol-polypropylene glycol copolymers.

Examples of the diamine-terminated polyethylene glycol-polypropylene glycol copolymers include a bis(2-aminopropyl) ether polyethylene glycol-polypropylene glycol copolymer and a bis(2-aminoethyl) ether polyethylene glycol-polypropylene glycol copolymer.

The aliphatic amine-polyoxyalkylene adducts, the aromatic amine-polyoxyalkylene adducts, and the polyvalent amine-polyoxyalkylene adducts are those in which polyoxyalkylene groups are bonded to the nitrogen atoms of amines. Examples of the amines include ethylenediamine, 1,3-propanediamine, 1,4-butanediamine, hexamethylenediamine, diethylenetriamine, laurylamine, stearylamine, oleylamine, beef tallow amine, hydrogenated beef tallow amine, tallow propyldiamine, meta-xylenediamine, tolylenediamine, para-xylenediamine, phenylenediamine, isophoronediamine, 1,10-decanediamine, 1,12-dodecanediamine, 4,4-diaminodicyclohexylmethane, 4,4-diaminodiphenylmethane, butane-1,1,4,4-tetramine, and pyrimidine-2,4,5,6-tetraamine.

For the amine, one type may be used alone, or two or more types may be mixed and used.

The amine is preferably one or more selected from the group consisting of azoles, alkylamines, aromatic amines, and aminoalcohols.

As the alkylamines, the aromatic amines, and the aminoalcohols, compounds represented by General Formula (2) are preferable.

$$R^{21}\text{—}NH_2 \quad (2)$$

[In the formula, $R^{21}$ represents an organic group.]

Examples of the organic group as $R^{21}$ in Formula (2) include a chain hydrocarbon group which has 1 to 20 carbon atoms and may have a substituent, an alicyclic hydrocarbon group which has 3 to 20 carbon atoms and may have a substituent, and an aromatic group which may have a substituent.

Examples of the substituent for $R^{21}$ include an amino group, a hydroxy group, a carboxy group, an acyl group, an alkoxy group, a carbonyl group, an aromatic hydrocarbon group, and a halogen atom. The aromatic group is a group having at least one aromatic ring, and examples thereof include an aromatic hydrocarbon ring such as benzene, naphthalene, anthracene, and phenanthrene; an aromatic heterocyclic ring in which some of the carbon atoms constituting an aromatic hydrocarbon ring are substituted with heteroatoms; and a fused ring in which an aromatic hydrocarbon ring and an aromatic heterocyclic ring are fused.

When $R^{21}$ is a chain hydrocarbon group, the chain hydrocarbon group may be linear or branched, but it is preferably linear. The chain hydrocarbon group is a saturated hydrocarbon group or an unsaturated hydrocarbon group, but is preferably a saturated hydrocarbon group.

The number of carbon atoms in the chain hydrocarbon group for $R^{21}$ is preferably 1 to 20, more preferably 1 to 16, further preferably 1 to 12, and particularly preferably 1 to 8.

When $R^{21}$ is an alicyclic hydrocarbon group, the alicyclic hydrocarbon group may be a polycyclic group or a monocyclic group.

The number of carbon atoms in the alicyclic hydrocarbon group for $R^{21}$ is preferably 3 to 20, more preferably 3 to 16, further preferably 3 to 12, and particularly preferably 3 to 8.

When $R^{21}$ is an aromatic group, examples of the aromatic group include those described above for the substituent for $R^{21}$.

As the organic group as $R^{21}$, a chain hydrocarbon group is preferable.

The organic group as $R^{21}$ preferably has an amino group or a hydroxy group.

Examples of the compound represented by General Formula (2) include monoethanolamine, triethylenetetramine, dipropylenetriamine, ethylenediamine, 1,3-propanediamine, 1,4-butanediamine, hexamethylenediamine, meta-xylenediamine, tolylenediamine, para-xylenediamine, phenylenediamine, isophoronediamine, 1,10-decanediamine, 1,12-dodecanediamine, 4,4-diaminodicyclohexylmethane, 4,4-diaminodiphenylmethane, butane-1,1,4,4-tetramine, and pyrimidine-2,4,5,6-tetraamine. It is preferable to include one or more selected from the group consisting of monoethanolamine, triethylenetetramine, and dipropylenetriamine.

When the flux according to the present embodiment contains the compound represented by General Formula (2), the content of the compound is 0.01% by mass or more, more preferably 0.03% by mass or more, and further preferably 0.05% by mass or more with respect to the total mass (100% by mass) of the flux. Furthermore, the content of the compound is preferably 1.00% by mass or less, more preferably 0.50% by mass or less, and further preferably 0.20% by mass or less with respect to the total mass (100% by mass) of the flux.

When the content of the compound is equal to or more than the above-mentioned lower limit value, a hot slump prevention ability is easily improved.

When the content of the compound is equal to or less than the above-mentioned upper limit value, the printability of a solder paste is easily improved.

The content of the compound represented by General Formula (2) is preferably 0.01% by mass or more and 1.00% by mass or less, more preferably 0.03% by mass or more and 0.50% by mass or less, and further preferably 0.05% by mass or more and 0.20% by mass or less with respect to the total mass (100% by mass) of the flux.

When the content of the compound is equal to or more than the above-mentioned lower limit value of the preferable range, a hot slump prevention ability is easily improved. When the content of the compound is equal to or less than the above-mentioned upper limit value of the preferable range, the printability of a solder paste is easily improved.

The content of the compound represented by General Formula (2) is preferably 0.001 mol/kg or more and 0.050 mol/kg or less, more preferably 0.003 mol/kg or more and 0.030 mol/kg or less, and further preferably 0.004 mol/kg or more and 0.020 mol/kg or less with respect to the total mass (1 kg) of the flux.

When the content of the compound is equal to or more than the above-mentioned lower limit value of the preferable range, a hot slump prevention ability is easily improved. When the content of the compound is equal to or less than the above-mentioned upper limit value of the preferable range, the printability of a solder paste is easily improved.

When the flux according to the present embodiment contains azoles, the content of the azoles is preferably 2% by mass or more and 8.5% by mass or less with respect to the total mass (100% by mass) of the flux.

When the content of the azoles is equal to or more than the above-mentioned lower limit value of the preferable range, the wettability of the flux is easily improved. This makes it easier to improve the solderability. When the content of the azoles is equal to or less than the above-mentioned upper limit value of the preferable range, the electrical reliability of a joined body is easily improved.

When the flux according to the present embodiment contains the compound represented by General Formula (2) and the azoles, the mixing ratio of the compound represented by General Formula (2) and the azoles is preferably 0.001 or more and 0.500 or less, more preferably 0.003 or more and 0.250 or less, further preferably 0.005 or more and 0.100 or less, and particularly preferably 0.010 or more and 0.040 or less, as the mass ratio of the compound represented by General Formula (2)/the azoles.

When the mixing ratio is equal to or more than the above-mentioned lower limit value of the preferable range, a hot slump prevention ability is easily improved. When the mixing ratio is equal to or less than the above-mentioned upper limit value of the preferable range, the printability of a solder paste is easily improved.

<<Organic Acid>>

Examples of the organic acids include carboxylic acids and organic sulfonic acids. Examples of the carboxylic acids include aliphatic carboxylic acids and aromatic carboxylic acids. Examples of the aliphatic carboxylic acids include aliphatic monocarboxylic acids and aliphatic dicarboxylic acids.

Examples of the aliphatic monocarboxylic acids include caproic acid, enanthic acid, caprylic acid, pelargonic acid, isopelargonic acid, capric acid, caproleic acid, lauric acid (dodecanoic acid), undecanoic acid, linderic acid, tridecanoic acid, myristoleic acid, pentadecanoic acid, isopalmitic acid, palmitoleic acid, hiragonic acid, hydnocarpic acid, margaric acid, isostearic acid, elaidic acid, petroselinic acid, moroctic acid, eleostearic acid, tariric acid, vaccenic acid, vernolic acid, sterculynic acid, nonadecanic acid, eicosanoic acid, stearic acid, 12-hydroxystearic acid, oleic acid, linoleic acid, linolenic acid, and myristic acid.

Examples of the aliphatic dicarboxylic acids include oxalic acid, malonic acid, succinic acid, glutaric acid, adipic acid, pimelic acid, suberic acid, azelaic acid, sebacic acid, dodecanedioic acid, eicosanedioic acid, diglycolic acid, tartaric acid, and 2,4-diethylglutaric acid.

Examples of the aromatic carboxylic acids include salicylic acid, dibutylaniline diglycolic acid, terephthalic acid, para-hydroxyphenylacetic acid, phenylsuccinic acid, phthalic acid, benzoic acid, 2,3-dihydroxybenzoic acid, 2-quinolinecarboxylic acid, 3-hydroxybenzoic acid, and p-anisic acid.

Furthermore, examples of the carboxylic acids include tris(2-carboxyethyl) isocyanurate and 1,3-cyclohexanedicarboxylic acid.

Examples of the carboxylic acids further include a compound represented by General Formula (c1).

$$R^{11}\text{—COOH} \qquad (c1)$$

[In the formula, $R^{11}$ represents a chain hydrocarbon group having 2 to 15 carbon atoms, an alicyclic hydrocarbon group having 3 to 15 carbon atoms, or an aromatic group, provided that $R^{11}$ has a hydroxy group.]

The chain hydrocarbon group as $R^{11}$ may be linear or branched.

The chain hydrocarbon group and the alicyclic hydrocarbon group may each be a saturated hydrocarbon group or an unsaturated hydrocarbon group, but a saturated hydrocarbon group is preferable.

The number of carbon atoms of the chain hydrocarbon group preferably is preferably 2 to 12, more preferably 3 to 9, particularly preferably 3 to 7, and most preferably 3 to 5.

Examples of the chain hydrocarbon group include a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, and a neohexyl group.

The number of carbon atoms of the alicyclic hydrocarbon group is preferably 3 to 12, more preferably 4 to 12, and further preferably 4 to 8.

Examples of the alicyclic hydrocarbon group include a cyclopropyl group, a cyclobutyl group, a cyclopentyl group, a cyclohexyl group, a cycloheptyl group, a cyclooctyl group, a cyclononyl group, a cyclodecyl group, and a cycloundecyl group.

Examples of the aromatic group as $R^{11}$ include those described above for the substituent for $R^{21}$.

When the aromatic group as $R^{11}$ has a substituent, examples of the substituent include a hydrocarbon group having 1 to 20 carbon atoms, an aromatic hydrocarbon group, a carboxy group, a hydroxy group, an amino group, and a halogen atom, among which a carboxy group or a hydroxy group is preferable.

Examples of an organic acid represented by General Formula (c1) include hydroxycarboxylic acid.

Examples of the hydroxycarboxylic acid include 2,2-bis(hydroxymethyl)propionic acid, 2,2-bis(hydroxymethyl)butanoic acid, citric acid, isocitric acid, malic acid, and tartaric acid.

Furthermore, examples of the carboxylic acids include polybasic carboxylic acid.

Examples of the polybasic carboxylic acid include dimer acid, trimer acid, hydrogenated dimer acid which is the hydrogenated product obtained by adding hydrogen to dimer acid, and hydrogenated trimer acid which is the hydrogenated product obtained by adding hydrogen to trimer acid.

Examples of the dimer acid and the trimer acid include dimer acid which is the reaction product of oleic acid and linoleic acid, trimer acid which is the reaction product of oleic acid and linoleic acid, dimer acid which is the reaction product of acrylic acid, trimer acid which is the reaction product of acrylic acid, dimer acid which is the reaction product of methacrylic acid, trimer acid which is the reaction product of methacrylic acid, dimer acid which is the reaction product of acrylic acid and methacrylic acid, trimer acid which is the reaction product of acrylic acid and methacrylic acid, dimer acid which is the reaction product of oleic acid, trimer acid which is the reaction product of oleic acid, dimer acid which is the reaction product of linoleic acid, trimer acid which is the reaction product of linoleic acid, dimer acid which is the reaction product of linolenic acid, trimer acid which is the reaction product of linolenic acid, dimer acid which is the reaction product of acrylic acid and oleic acid, trimer acid which is the reaction product of acrylic acid and oleic acid, dimer acid which is the reaction product of acrylic acid and linoleic acid, trimer acid which is the reaction product of acrylic acid and linoleic acid, dimer acid which is the reaction product of acrylic acid and linolenic acid, trimer acid which is the reaction product of acrylic acid and linolenic acid, dimer acid which is the reaction product of methacrylic acid and oleic acid, trimer acid which is the reaction product of methacrylic acid and oleic acid, dimer acid which is the reaction product of methacrylic acid and linoleic acid, trimer acid which is the reaction product of methacrylic acid and linoleic acid, dimer acid which is the reaction product of methacrylic acid and linolenic acid, trimer acid which is the reaction product of methacrylic acid and linolenic acid, dimer acid which is the reaction product of oleic acid and linolenic acid, trimer acid which is the reaction product of oleic acid and linolenic acid, dimer acid which is the reaction product of linoleic acid and linolenic acid, trimer acid which is the reaction product of linoleic acid and linolenic acid, hydrogenated dimer acid which is the hydrogenated product of each of the above-mentioned dimer acids, and hydrogenated trimer acid which is the hydrogenated product of each of the above-mentioned trimer acid.

For example, dimer acid, which is the reaction product of oleic acid and linoleic acid, is a dimer having 36 carbon atoms. Furthermore, trimer acid, which is the reaction product of oleic acid and linoleic acid, is a trimer having 54 carbon atoms.

When the flux according to the present embodiment contains the polybasic carboxylic acid, the content of the polybasic carboxylic acid is preferably 3% by mass or more and 20% by mass or less, and more preferably 5 mass % or more and 15 mass % or less are preferable with respect to the total mass (100% by mass) of the flux.

When the content of the polybasic carboxylic acid is equal to or more than the above-mentioned lower limit value of the preferable range, the solderability is easily improved. When the content of the polybasic carboxylic acid is equal to or less than the above-mentioned upper limit value of the preferable range, the electrical reliability of a joined body is easily improved.

Examples of the carboxylic acids further include a compound represented by General Formula (p1).

(p1)

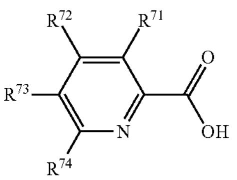

[In Formula (p1), $R^{71}$, $R^{72}$, $R^{73}$, and $R^{74}$ each independently represent a hydrocarbon group, a hydroxy group, a halogen atom, or a hydrogen atom.]

Examples of the hydrocarbon groups as $R^{71}$, $R^{72}$, $R^{73}$, and $R^{74}$ include a chain hydrocarbon group which has 1 to 20 carbon atoms and may have a substituent, an alicyclic hydrocarbon group which has 3 to 20 carbon atoms and may have a substituent, an amino group, a hydroxy group, and a carboxy group.

The chain hydrocarbon group may be linear or branched. The chain hydrocarbon group is a saturated hydrocarbon group or an unsaturated hydrocarbon group, but is preferably a saturated hydrocarbon group.

The alicyclic hydrocarbon group may be a polycyclic group or a monocyclic group. The monocyclic alicyclic hydrocarbon group is preferably a group obtained by removing one or more hydrogen atoms from a monocycloalkane. The polycyclic alicyclic hydrocarbon group is preferably a group obtained by removing one or more hydrogen atoms from a polycycloalkane.

Examples of the substituents that may be possessed by the hydrocarbon groups as $R^{71}$, $R^{72}$, $R^{73}$, and $R^{74}$ include an amino group, a hydroxy group, a carboxy group, an acyl group, an alkoxy group, a carbonyl group, and a halogen atom.

The hydrocarbon group is preferably a chain hydrocarbon group which has 1 to 5 carbon atoms and may have a substituent, or a carboxy group. Examples of the chain hydrocarbon group include a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, and a neopentyl group. As the hydrocarbon group, a carboxy group is preferable.

Examples of the compound represented by General Formula (p1) include picolinic acid, dipicolinic acid, and 3-hydroxypicolinic acid.

3-Hydroxypicolinic acid is a compound in which in General Formula (p1), $R^{71}$ is a hydroxy group, and $R^{72}$, $R^{73}$, and $R^{74}$ are hydrogen atoms.

Examples of the organic sulfonic acids include aliphatic sulfonic acids and aromatic sulfonic acids. Examples of the aliphatic sulfonic acids include alkanesulfonic acids and alkanolsulfonic acids.

Examples of the alkanesulfonic acids include methanesulfonic acid, ethanesulfonic acid, 1-propanesulfonic acid, 2-propanesulfonic acid, 1-butanesulfonic acid, 2-butanesulfonic acid, pentanesulfonic acid, hexanesulfonic acid, decanesulfonic acid, and dodecanesulfonic acid.

Examples of the alkanolsulfonic acids include 2-hydroxyethane-1-sulfonic acid, 2-hydroxypropane-1-sulfonic acid, 2-hydroxybutane-1-sulfonic acid, 2-hydroxypentane-1-sulfonic acid, 1-hydroxypropane-2-sulfonic acid, 3-hydroxypropane-1-sulfonic acid, 4-hydroxybutane-1-sulfonic acid, 2-hydroxyhexane-1-sulfonic acid, 2-hydroxydecane-1-sulfonic acid, and 2-hydroxydodecane-1-sulfonic acid.

Examples of the aromatic sulfonic acids include 1-naphthalenesulfonic acid, 2-naphthalenesulfonic acid, p-toluenesulfonic acid, xylenesulfonic acid, p-phenolsulfonic acid, cresolsulfonic acid, sulfosalicylic acid, nitrobenzenesulfonic acid, sulfobenzoic acid, and diphenylamine-4-sulfonic acid.

For the organic acid, one type may be used alone, or two or more types may be mixed and used.

The organic acid preferably includes carboxylic acid, and more preferably includes one or more selected from polybasic carboxylic acid, aliphatic dicarboxylic acid, and aromatic carboxylic acid.

As the aliphatic dicarboxylic acid, a compound represented by General Formula (3) is preferable.

(3)

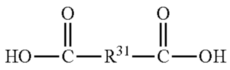

[In the formula, $R^{31}$ represents an organic group or a single bond.]

Examples of the organic group as $R^{31}$ in Formula (3) include a chain hydrocarbon group which has 1 to 20 carbon atoms and may have a substituent, and an alicyclic hydrocarbon group which has 3 to 20 carbon atoms and may have a substituent, among which a chain hydrocarbon group is preferable. A methylene group in the hydrocarbon group may be substituted with an oxygen atom.

Examples of the substituent for $R^{31}$ include an amino group, a hydroxy group, a carboxy group, an acyl group, an alkoxy group, a carbonyl group, and a halogen atom.

When $R^{31}$ is a chain hydrocarbon group, the chain hydrocarbon group may be linear or branched, but it is preferably linear. The chain hydrocarbon group is a saturated hydrocarbon group or an unsaturated hydrocarbon group, but is preferably a saturated hydrocarbon group.

The number of carbon atoms in the chain hydrocarbon group for $R^{31}$ is preferably 1 to 20, more preferably 1 to 16, further preferably 1 to 12, and particularly preferably 1 to 8.

When $R^{31}$ is an alicyclic hydrocarbon group, the alicyclic hydrocarbon group may be a polycyclic group or a monocyclic group.

The number of carbon atoms in the alicyclic hydrocarbon group for $R^{31}$ is preferably 3 to 20, more preferably 3 to 16, further preferably 3 to 12, and particularly preferably 3 to 8.

As the compound represented by General Formula (3), it is preferable to include one or more selected from the group consisting of oxalic acid, malonic acid, succinic acid, glutaric acid, adipic acid, pimelic acid, suberic acid, azelaic acid, sebacic acid, dodecanedioic acid, eicosanedioic acid, and diglycolic acid, and it is more preferable to include one or more selected from the group consisting of malonic acid, succinic acid, glutaric acid, adipic acid, and azelaic acid.

When the flux according to the present embodiment contains the compound represented by General Formula (3), the content of the compound is 0.02% by mass or more, more preferably 0.04% by mass or more, and further preferably 0.06% by mass or more with respect to the total mass (100% by mass) of the flux.

Furthermore, the content of the compound is preferably 35% by mass or less, more preferably 30% by mass or less, and further preferably 25% by mass or less with respect to the total mass (100% by mass) of the flux.

When the content of the compound is equal to or more than the above-mentioned lower limit value, a hot slump prevention ability is easily improved. When the content of the compound is equal to or less than the above-mentioned upper limit value, the electrical reliability of a joined body is easily improved.

When the flux according to the present embodiment contains the compound represented by General Formula (3), the content of the compound is 0.02% by mass or more and 35% by mass or less, more preferably 0.04% by mass or more and 30% by mass or less, and further preferably 0.06% by mass or more and 25% by mass or less with respect to the total mass (100% by mass) of the flux.

When the content of the compound is equal to or more than the above-mentioned lower limit value of the preferable range, a hot slump prevention ability is easily improved. When the content of the compound is equal to or less than the above-mentioned upper limit value of the preferable range, the electrical reliability of a joined body is easily improved.

In the flux according to the present embodiment, the mixing ratio of the compound represented by General Formula (2) and the compound represented by General Formula (3) is preferably 0.3 or more, more preferably 0.5 or more, further preferably 0.7 or more, and particularly preferably 1.00 or more, as the molar ratio of the compound represented by General Formula (3)/the compound represented by General Formula (2), that is, the ratio of the total number of moles represented by General Formula (3) to the total number of moles of the compound represented by General Formula (2). The upper limit value of the molar ratio of the compound represented by General Formula (3)/the compound represented by General Formula (2) is not particularly limited, but may be 1,000 or 500, for example.

The molar ratio of the compound represented by General Formula (3)/the compound represented by General Formula (2) is preferably 0.3 or more and 1,000 or less, more preferably 0.5 or more and 1,000 or less, further preferably 0.7 or more and 1,000 or less, and particularly preferably 1.00 or more and 1,000 or less.

Alternatively, the molar ratio of the compound represented by General Formula (3)/the compound represented by General Formula (2) is preferably 0.3 or more and 500 or less, more preferably 0.5 or more and 500 or less, further preferably 0.7 or more and 500 or less, and particularly preferably 1.00 or more and 500 or less.

The total content of the organic acids in the flux is preferably 5% by mass or more and 35% by mass or less, more preferably 7% by mass or more and 30% by mass or less with respect to the total mass (100% by mass) of the flux.

When the total content of the organic acids is equal to or more than the above-mentioned lower limit value of the preferable range, the wettability of the flux is easily improved. This makes it easier to improve the solderability. When the total content of the organic acids is equal to or less than the above-mentioned upper limit value of the preferable range, the electrical reliability of a joined body can be easily improved.

<<Halogenated Compound>>

Examples of the halogenated compounds include amine hydrohalic acid salts, and organic halogenated compounds other than amine hydrohalic acid salts.

An amine hydrohalic acid salt is a compound obtained by reacting an amine with a hydrogen halide.

Examples of the amine herein include those described above in <<Amine>>.

More specifically, examples of the amine hydrohalic acid salts include cyclohexylamine hydrobromide, hexadecylamine hydrobromide, stearylamine hydrobromide, ethylamine hydrobromide, diphenylguanidine hydrobromide, ethylamine hydrochloride, stearylamine hydrochloride, diethylaniline hydrochloride, diethanolamine hydrochloride, 2-ethylhexylamine hydrobromide, pyridine hydrobromide, isopropylamine hydrobromide, diethylamine hydrobromide, dimethylamine hydrobromide, dimethylamine hydrochloride, rosinamine hydrobromide, 2-ethylhexylamine hydrochloride, isopropylamine hydrochloride, cyclohexylamine hydrochloride, 2-pipecoline hydrobromide, 1,3-diphenylguanidine hydrochloride, dimethylbenzylamine hydrochloride, hydrazine hydrate hydrobromide, dimethylcyclohexylamine hydrochloride, trinonylamine hydrobromide, diethylaniline hydrobromide, 2-diethylaminoethanol hydrobromide, 2-diethylaminoethanol hydrochloride, ammonium chloride, diallylamine hydrochloride, diallylamine hydrobromide, diethylamine hydrochloride, triethylamine hydrobromide, triethylamine hydrochloride, hydrazine monohydrochloride, hydrazine dihydrochloride, hydrazine monohydrobromide, hydrazine dihydrobromide, pyridine hydrochloride, aniline hydrobromide, butylamine hydrochloride, hexylamine hydrochloride, n-octylamine hydrochloride, dodecylamine hydrochloride, dimethylcyclohexylamine hydrobromide, ethylenediamine dihydrobromide, rosinamine hydrobromide, 2-phenylimidazole hydrobromide, 4-benzylpyridine hydrobromide, L-glutamic acid hydrochloride, N-methylmorpholine hydrochloride, betaine hydrochloride, 2-pipecoline hydroiodide, cyclohexylamine hydroiodide, 1,3-diphenylguanidine hydrofluoride, diethylamine hydrofluoride, 2-ethylhexylamine hydrofluoride, cyclohexylamine hydrofluoride, ethylamine hydrofluoride, rosinamine hydrofluoride, cyclohexylamine tetrafluoroborate, and dicyclohexylamine tetrafluoroborate.

Furthermore, as the halogenated compound, for example, a salt obtained by reacting an amine with tetrafluoroboric acid ($HBF_4$), and a complex obtained by reacting an amine with boron trifluoride ($BF_3$) can also be used.

Examples of the complex include boron trifluoride piperidine.

Examples of the organic halogenated compounds other than the amine hydrohalic acid salts include halogenated aliphatic compounds. The halogenated aliphatic hydrocarbon group refers to one in which a part or all of hydrogen atoms constituting the aliphatic hydrocarbon group are substituted with halogen atoms.

Examples of the halogenated aliphatic compound include halogenated aliphatic alcohols and halogenated heterocyclic compounds.

Examples of the halogenated aliphatic alcohols include 1-bromo-2-propanol, 3-bromo-1-propanol, 3-bromo-1,2-propanediol, 1-bromo-2-butanol, 1,3-dibromo-2-propanol, 2,3-dibromo-1-propanol, 1,4-dibromo-2-butanol, and trans-2,3-dibromo-2-butene-1,4-diol.

Examples of the halogenated heterocyclic compounds include a compound represented by General Formula (h1).

$$R^{22}—(R^{23})_n \quad (h1)$$

[In the formula, $R^{22}$ represents an n-valent heterocyclic group, and $R^{23}$ represents a halogenated aliphatic hydrocarbon group.]

Examples of heterocyclic rings of the n-valent heterocyclic group as $R^{22}$ include a ring structure in which a part of carbon atoms constituting an aliphatic hydrocarbon or an aromatic hydrocarbon ring is substituted with a heteroatom. Examples of the heteroatom in this heterocyclic ring include an oxygen atom, a sulfur atom, and a nitrogen atom. This heterocyclic ring is preferably a 3- to 10-membered ring, and more preferably a 5- to 7-membered ring. Examples of this heterocyclic ring include an isocyanurate ring.

The halogenated aliphatic hydrocarbon group as $R^{23}$ preferably has 1 to 10 carbon atoms, more preferably 2 to 6 carbon atoms, and further preferably 3 to 5 carbon atoms. Furthermore, $R^{23}$ is preferably a brominated aliphatic hydrocarbon group or a chlorinated aliphatic hydrocarbon group, more preferably a brominated aliphatic hydrocarbon group, and further preferably a brominated saturated aliphatic hydrocarbon group.

Examples of the halogenated heterocyclic compounds include tris-(2,3-dibromopropyl)isocyanurate.

Examples of the organic halogen compounds other than the amine hydrohalic acid salts further include halogenated carboxyl compounds such as carboxyl iodide compounds such as 2-iodobenzoic acid, 3-iodobenzoic acid, 2-iodopropionic acid, 5-iodosalicylic acid, 5-iodoanthranilic acid; carboxyl chloride compounds such as 2-chlorobenzoic acid and 3-chloropropionic acid; and brominated carboxyl compounds such as 2,3-dibromopropionic acid, 2,3-dibromosuccinic acid, and 2-bromobenzoic acid.

For the halogenated compound, one type may be used alone, or two or more types may be mixed and used.

The content of the activator in the flux is preferably 5% by mass or more and 50% by mass or less, more preferably 10% by mass or more and 45% by mass or less, and further preferably 15% by mass or more and 40% by mass or less with respect to the total mass (100% by mass) of the flux.

<Solvent>

Examples of the solvent include water, alcohol solvents, glycol ether solvents, and terpineols.

Examples of the alcohol solvents include isopropyl alcohol, 1,2-butanediol, 1,3-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 2-methylpentane-2,4-diol, 1,1,1-tris(hydroxymethyl)propane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, 1-ethynyl-1-cyclohexanol, 1,4-cyclohexanediol, 1,4-cyclohexanedimethanol, 2,4,7,9-tetramethyl-5-decyne-4,7-diol, 2-hexyl-1-decanol, and octanediol.

Examples of the glycol ether solvents include diethylene glycol mono-2-ethylhexyl ether, ethylene glycol monophenyl ether, diethylene glycol monohexyl ether (hexyl diglycol), diethylene glycol dibutyl ether, triethylene glycol monobutyl ether, methylpropylene triglycol, triethylene glycol butyl methyl ether, tetraethylene glycol, tetraethylene glycol dimethyl ether, and tripropylene glycol-n-butyl ether.

Examples of the terpineols include α-terpineol, β-terpineol, γ-terpineol, and terpineol mixtures (that is, mixtures containing β-terpineol or γ-terpineol with α-terpineol as a main component).

Examples of other solvents include dioctyl sebacate (DOS) and liquid paraffin.

The flux according to the present embodiment preferably contains a solvent having a dielectric constant of 4 or less.

Examples of the solvent having a dielectric constant of 4 or less include α-terpineol, β-terpineol, γ-terpineol, terpineol mixtures, 2-hexyl-1-decanol, octanediol, dioctyl sebacate (DOS), and liquid paraffin, and one or more selected from the group consisting of α-terpineol and 2-hexyl-1-decanol are preferable.

The lower limit value of the dielectric constant of the solvent having a dielectric constant of 4 or less maybe, for example, 1.5, 1.7, 1.9, or 2.0.

In the present specification, the dielectric constant of the solvent means a measurement value of a dielectric constant at 1 GHz using a cavity resonator method dielectric constant measurement device (manufactured by AET, INC.) in accordance with JIS C 2565: 1992 standards.

Alternatively, the dielectric constant of the solvent can also be said to mean a measurement value of a dielectric constant measured according to ASTM D2520.

For the solvent, one type may be used alone, or two or more types may be mixed and used.

When the flux according to the present embodiment contains the solvent having a dielectric constant of 4 or less, the content of the solvent having a dielectric constant of 4 or less is 5% by mass or more and 20% by mass or less, more preferably 5% by mass or more and 15% by mass or less, and further preferably 5% by mass or more and 10% by mass or less with respect to the total mass (100% by mass) of the flux.

The solvent is the remainder of the flux according to the present embodiment, and the content of the solvent is determined according to the other components. The content of the solvent in the present embodiment may be 25% by mass or more and 70% by mass or less, or may be 30% by mass or more and 60% by mass or less, for example, with respect to the total mass (100% by mass) of the flux.

The flux according to the present embodiment may contain other components as necessary in addition to the resin component, the activator, and the solvent.

Examples of the other components include thixotropic agents, surfactants, metal deactivators, antioxidants, silane coupling agents, and colorants.

<<Thixotropic Agent>>

Examples of the thixotropic agent include ester-based thixotropic agents, amide-based thixotropic agents, and sorbitol-based thixotropic agents.

Examples of the ester-based thixotropic agents include ester compounds, and specific examples thereof include hydrogenated castor oil and ethyl myristate.

Examples of the amide-based thixotropic agents include monoamides, bisamides, and polyamides.

Examples of the monoamides include lauric acid amide, palmitic acid amide, stearic acid amide, behenic acid amide, hydroxystearic acid amide, saturated fatty acid amide, oleic acid amide, erucic acid amide, unsaturated fatty acid amide, 4-methylbenzamide (p-toluamide), p-toluenemethanamide, aromatic amide, hexamethylene hydroxystearic amide, substituted amide, methylolstearic amide, methylolamide, and fatty acid ester amide.

Examples of the bisamides include ethylenebis fatty acid (fatty acid carbon number C6-24) amide, ethylenebis hydroxy fatty acid (fatty acid carbon number C6-24) amide, hexamethylenebis fatty acid (fatty acid carbon number C6-24) amide, hexamethylenebis hydroxy fatty acid (fatty acid carbon number C6-24) amide, and aromatic bisamide. Examples of fatty acids that are raw materials for the bisamides include stearic acid (carbon number C18), oleic acid (carbon number C18), and lauric acid (carbon number C12).

Examples of the polyamides include polyamides such as saturated fatty acid polyamides, unsaturated fatty acid polyamides, aromatic polyamides, 1,2,3-propanetricarboxylic acid tris(2-methylcyclohexylamide), cyclic amide oligomers, and acyclic amide oligomers.

Examples of the above-mentioned cyclic amide oligomers include an amide oligomer in which a dicarboxylic acid and a diamine are cyclically polycondensed, an amide oligomer in which a tricarboxylic acid and a diamine are cyclically polycondensed, an amide oligomer in which a dicarboxylic acid and a triamine are cyclically polycondensed, an amide oligomer in which a tricarboxylic acid and a triamine are cyclically polycondensed, an amide oligomer in which a dicarboxylic acid and a tricarboxylic acid, and a diamine are cyclically polycondensed, an amide oligomer in which a dicarboxylic acid and a tricarboxylic acid, and a triamine are cyclically polycondensed, an amide oligomer in which a dicarboxylic acid, and a diamine and a triamine are cyclically polycondensed, an amide oligomer in which a tricarboxylic acid, and a diamine and a triamine are cyclically polycondensed, and an amide oligomer in which a dicarboxylic acid and a tricarboxylic acid, and a diamine and a triamine are cyclically polycondensed.

Furthermore, examples of the above-mentioned acyclic amide oligomers include a case of an amide oligomer in which a monocarboxylic acid, and a diamine and/or a triamine are acyclically polycondensed, and a case of an amide oligomer in which a dicarboxylic acid and/or a tricarboxylic acid, and a monoamine are acyclically polycondensed. In the case of an amide oligomer containing a monocarboxylic acid or a monoamine, the monocarboxylic acid and the monoamine function as terminal molecules, thereby resulting in an acyclic amide oligomer having a reduced molecular weight. Furthermore, when the acyclic amide oligomer is an amide compound in which a dicarboxylic acid and/or a tricarboxylic acid, and a diamine and/or a triamine are acyclically polycondensed, it is an acyclic polymer-based amide polymer. Furthermore, the acyclic amide oligomer also includes an amide oligomer in which a monocarboxylic acid and a monoamine are acyclically condensed.

Examples of the sorbitol-based thixotropic agents include dibenzylidene-D-sorbitol, bis(4-methylbenzylidene)-D-sorbitol, (D−)sorbitol, monobenzylidene(-D−)sorbitol, and mono(4-methylbenzylidene)-(D−)sorbitol.

The flux according to the present embodiment may not contain the thixotropic agent or may contain the thixotropic agent.

In the flux according to the present embodiment, even when the content of the thixotropic agent is low or the thixotropic agent is not contained, the separation of a solder paste into a solder powder and the flux over time can be prevented at the time of storage.

When the flux according to the present embodiment contains the thixotropic agent, for the thixotropic agent, one type may be used alone, or two or more types may be mixed and used.

When the flux according to the present embodiment contains the thixotropic agent, the thixotropic agent is preferably an ester-based thixotropic agent, and is more preferably a hydrogenated castor oil.

When the flux according to the present embodiment contains the thixotropic agent, the content of the thixotropic agent is preferably more than 0% by mass and equal to or less than 5% by mass, more preferably more than 0% by mass and equal to or less than 4% by mass, particularly preferably more than 0% by mass and equal to or less than 3% by mass, and most preferably more than 0% by mass and equal to or less than 2% by mass with respect to the total mass of the flux (100% by mass). The upper limit value of the content of the thixotropic agent maybe 1.8% by mass, 1.6% by mass, 1.4% by mass, 1.2% by mass, 1.0% by mass, 0.8% by mass, 0.6% by mass, 0.4% by mass, 0.2% by mass, or 0.1% by mass with respect to the total mass (100% by mass) of the flux.

When the content of the thixotropic agent is equal to or less than the above-mentioned upper limit value of the preferable range, the precipitation of the thixotropic agent on the surface of a flux residue is easily prevented. This makes it easier to prevent a decrease in soldering strength when an underfill is used. In addition, even when the content of the thixotropic agent is equal to or less than the above-mentioned upper limit value, the separation of a solder paste into a solder powder and the flux over time can be prevented at the time of storage.

<<Surfactant>>

Examples of the surfactants include nonionic surfactants.

Examples of the nonionic surfactants include polyoxyalkylene adducts.

Examples of alkylene oxides from which the polyoxyalkylene adducts are derived include ethylene oxides, propylene oxides, and butylene oxides.

Examples of the polyoxyalkylene adducts include polyethylene glycol, polypropylene glycol, polyethylene glycol-polypropylene glycol copolymers, ethylene oxide-resorcinol copolymers, polyoxyalkylene acetylene glycols, polyoxyalkylene glyceryl ethers, polyoxyalkylene alkyl ethers, polyoxyalkylene esters, and polyoxyalkylenealkylamides.

Alternatively, examples of the nonionic surfactants include polyoxyalkylene adducts of alcohols. Examples of the alcohols include aliphatic alcohols, aromatic alcohols, and polyhydric alcohols.

For the surfactant, one type may be used alone, or two or more types may be mixed and used.

<<Metal Deactivator>>

Examples of the metal deactivators include hindered phenolic compounds and nitrogen compounds.

The term “metal deactivator” herein refers to a compound having a capacity to prevent metal from deteriorating due to contact with a certain type of compound.

The hindered phenolic compound refers to a phenolic compound having a bulky substituent (for example, a branched or cyclic alkyl group such as a t-butyl group) on at least one of the ortho positions of phenol.

The hindered phenolic compound is not particularly limited, and examples thereof include bis[3-(3-tert-butyl-4-hydroxy-5-methylphenyl)propionic acid][ethylenebis(oxyethylene)], N,N'-hexamethylenebis[3-(3,5-di-tert-butyl-4-hydroxyphenyl)propanamide], 1,6-hexanediol bis[3-(3,5-di-tert-butyl-4-hydroxyphenyl)propionate], 2,2'-dihydroxy-3,3'-bis(α-methylcyclohexyl)-5,5'-dimethyldiphenylmethane, 2,2'-methylenebis(6-tert-butyl-p-cresol), 2,2'-methylenebis(6-tert-butyl-4-ethylphenol), triethylene glycol-bis[3-(3-tert-butyl-5-methyl-4-hydroxyphenyl)propionate], 1,6-hexanediol-bis-[3-(3,5-di-tert-butyl-4-hydroxyphenyl)propionate], 2,4-bis-(n-octylthio)-6-(4-hydroxy-3,5-di-t-butylanilino)-1,3,5-triazine, pentaerythrityl-tetrakis[3-(3,5-di-tert-butyl-4-hydroxyphenyl)propionate], 2,2-thio-diethylenebis[3-(3,5-di-tert-butyl-4-hydroxyphenyl)propionate], octadecyl-3-(3,5-di-tert-butyl-4-hydroxyphenyl)propionate, N,N'-hexamethylenebis(3,5-di-t-butyl-4-hydroxy-hydrocinnamamide), 3,5-di-tert-butyl-4-hydroxybenzylphosphonate-diethyl ester, 1,3,5-trimethyl-2,4,6-tris(3,5-di-tert-butyl-4-hydroxybenzyl)benzene, N,N'-bis[2-[2-(3,5-di-tert-butyl-4-hydroxyphenyl)ethylcarbonyloxy]ethyl]oxamide, and a compound represented by the following chemical formula.

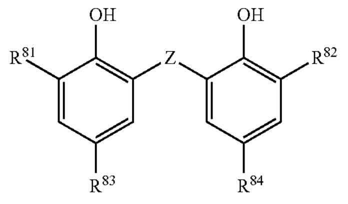

(In the formula, Z is an alkylene group that may be substituted; $R^{81}$ and $R^{82}$ are each independently an alkyl group, an aralkyl group, an aryl group, a heteroaryl group, a cycloalkyl group, or a heterocycloalkyl group, which may be substituted; and $R^{83}$ and $R^{84}$ are each independently an alkyl group that may be substituted.)

Examples of the nitrogen compound in the metal deactivator include hydrazide-based nitrogen compounds, amide-based nitrogen compounds, triazole-based nitrogen compounds, and melamine-based nitrogen compounds.

The hydrazide-based nitrogen compound may be any nitrogen compound having a hydrazide skeleton, and examples thereof include dodecanedioate bis[N2-(2-hydroxybenzoyl)hydrazide], N,N'-bis[3-(3,5-di-tert-butyl-4-hydroxyphenyl)propionyl]hydrazine, decanedicarboxylic acid disalicyloyl hydrazide, N-salicylidene-N'-salicylhydrazide, m-nitrobenzhydrazide, 3-aminophthalhydrazide, phthalic dihydrazide, adipic hydrazide, oxalobis(2-hydroxy-5-octylbenzylidene hydrazide), N'-benzoylpyrrolidonecarboxylic acid hydrazide, and N,N'-bis(3-(3,5-di-tert-butyl-4-hydroxyphenyl)propionyl)hydrazine.

The amide-based nitrogen compound may be any nitrogen compound having an amide skeleton, and examples thereof include N,N'-bis{2-[3-(3,5-di-tert-butyl-4-hydroxyphenyl) propionyloxyl]ethyl}oxamide.

The triazole-based nitrogen compound may be any nitrogen compound having a triazole skeleton, and examples thereof include N-(2H-1,2,4-triazol-5-yl) salicylamide, 3-amino-1,2,4-triazole, and 3-(N-salicyloyl)amino-1,2,4-triazole.

The melamine-based nitrogen compound may be any nitrogen compound having a melamine skeleton, and examples thereof include melamine and melamine derivatives. More specifically, examples thereof include trisaminotriazine, alkylated trisaminotriazine, alkoxyalkylated trisaminotriazine, melamine, alkylated melamine, alkoxyalkylated melamine, N2-butylmelamine, N2,N2-diethylmelamine, and N,N,N',N',N",N"-hexakis(methoxymethyl)melamine.

For the metal deactivator, one type may be used alone, or two or more types may be mixed and used.

When the flux according to the present embodiment contains the metal deactivator, the content of the metal deactivator is preferably 1% by mass or more and 10% by mass or less, and more preferably 2% by mass or more and 6% by mass or less with respect to the total mass (100% by mass) of the flux.

<<Antioxidant>>

Examples of the antioxidants include hindered phenolic antioxidants such as 2,2'-dihydroxy-3,3'-bis(α-methylcyclohexyl)-5,5'-dimethyldiphenylmethane.

The term "antioxidant" herein refers to a compound having a capacity of reducing the acid value of a solder alloy powder.

When the flux according to the present embodiment contains the antioxidant, the content of the antioxidant is preferably 1% by mass or more and 10% by mass or less, and more preferably 2% by mass or more and 6% by mass or less with respect to the total mass (100% by mass) of the flux.

In the flux according to the embodiment described above, the mixing ratio of the copolymer (A) and the rosin (B) is 1 or more as the mass ratio represented by the copolymer (A)/the rosin (B). This can reduce cracking of a flux residue due to temperature changes. Furthermore, in the flux of the present embodiment, since the mass ratio represented by the copolymer (A)/the rosin (B) is 1 or more, even when the content of the thixotropic agent is low, the separation of a solder paste into a solder powder and the flux over time can be prevented at the time of storage, and a decrease in soldering strength when an underfill is used can also be prevented.

In the flux that further contains the compound represented by General Formula (2), a hot slump prevention ability can also be improved in addition to the above-mentioned effects.

(Solder Paste)

A solder paste of the present embodiment contains a solder alloy powder and the above-mentioned flux.

The solder alloy powder may be constituted of an Sn-only solder powder; or a powder of an Sn—Ag-based, Sn—Cu-based, Sn—Ag—Cu-based, Sn—Bi-based, or Sn—In-based solder alloy, or a powder of solder alloys in which Sb, Bi, In, Cu, Zn, As, Ag, Cd, Fe, Ni, Co, Au, Ge, P, or the like has been added to the above alloys.

The solder alloy powder may be constituted of a powder of an Sn—Pb-based solder alloy, or a powder of solder alloys in which Sb, Bi, In, Cu, Zn, As, Ag, Cd, Fe, Ni, Co, Au, Ge, P, or the like has been added to the Sn—Pb-based solder alloy.

The solder alloy powder is preferably a Pb-free solder.

As the solder alloy powder, a solder alloy powder having a melting temperature of 150° C. to 250° C. can be used, for example.

Content of Flux:

The content of the flux in the solder paste is preferably 5% to 30% by mass and more preferably 5% to 15% by mass with respect to the total mass of the solder paste.

The solder paste according to the present embodiment described above can reduce cracking of a flux residue due to temperature changes. Furthermore, even when the thixotropic agent is not contained in such a solder paste, the separation into the solder powder and the flux over time can be prevented at the time of storage, and a decrease in soldering strength when an underfill is used can also be prevented.

Hereinabove, while the embodiment of the disclosure has been described in detail with reference to the accompanying drawings, characteristic parts may be enlarged for convenience in these drawings, and dimensional ratios or the like of the components are not limited to those shown in the drawings.

A specific configuration of the embodiment according to the present invention is not limited to the embodiment of the disclosure, and may be changed or substituted without departing from the spirit of the disclosure.

EXAMPLES

Hereinafter, the present invention will be described with reference to examples, but the present invention is not limited to the following examples.

<Preparation of Flux>

Examples 1 to 53 and Comparative Examples 1 to 12

Fluxes of each of examples and comparative examples were blended using the compositions shown in Tables 1 to 6. In the tables, a value in each of the columns indicates a content (% by mass) of each of the components with respect to a total mass (100% by mass) of each flux, and a blank indicates “0% by mass”.

Each component was put in a stainless steel can and was heated until melted while stirring to be dissolved uniformly. Thereafter, the temperature was kept at 130° C. for 10 minutes, and cooling was performed thereafter for 24 hours to obtain a flux.

Copolymer (A):

Ethylene-Acrylic Acid Copolymer #1:

The acid value was 120, and the weight-average molecular weight was about 8,000. The content of repeating units derived from acrylic acid was 15% by mass with respect to the total mass (100% by mass) of the ethylene-acrylic acid copolymer. The ratio represented by the repetition number of the repeating units derived from ethylene/the repetition number of repeating units derived from acrylic acid was 14.1.

Ethylene-Acrylic Acid Copolymer #2:

The acid value was 40, and the weight-average molecular weight was about 5,000. The content of repeating units derived from acrylic acid was 5% by mass with respect to the total mass (100% by mass) of the ethylene-acrylic acid copolymer. The ratio represented by the repetition number of the repeating units derived from ethylene/the repetition number of repeating units derived from acrylic acid was 47.4.

Other Resins:

Polyacrylic acid ester homopolymer (weight-average molecular weight: about 30,000), polyethylene homopolymer (weight-average molecular weight: about 3,000), and 1,2-polybutadiene homopolymer (number-average molecular weight: 2,100)

Rosin (B):

Maleic Acid-Modified Hydrogenated Rosin and Hydrogenated Rosin

Solvent:

α-Terpineol (dielectric constant: 2.9), 2-hexyl-1-decanol (dielectric constant: 2.1), diethylene glycol mono-2-ethylhexyl ether (dielectric constant: 5.0), and tetraethylene glycol (dielectric constant: 35)

Organic Acid:

Malonic acid, succinic acid, glutaric acid, adipic acid, azelaic acid, phenylsuccinic acid, and dimer acid Amine:

Triethylenetetramine, dipropylenetriamine, monoethanolamine, diethylethylenediamine, bis(2-ethylhexyl) amine, and N,N,N',N'-tetrakis(2-hydroxypropylethylenediamine)

Azoles:

3-(N-salicyloyl)amino-1,2,4-triazole and 2-ethylimidazole

Thixotropic Agent:

Hydrogenated Castor Oil

Antioxidant:

2,2'-Dihydroxy-3,3'-bis(α-methylcyclohexyl)-5,5'-dimethyldiphenylmethane

<Preparation of Solder Paste>

Each of the fluxes of Examples 1 to 53 and Comparative Examples 1 to 12, and each of the following solder alloy powders were mixed to blend solder pastes. In all of the blended solder pastes, the flux was 11% by mass, and the solder alloy powder was 89% by mass.

The solder alloy powder is powder consisting of a solder alloy containing 3% by mass of Ag, 0.5% by mass of Cu, and the balance of Sn. This solder alloy has the solidus temperature of 217° C. and a liquidus temperature of 220° C.

<<Evaluation of temperature cycle reliability>>, <<Evaluation of solder paste separation prevention ability>>, <<Evaluation of shear strength>>, and <<Evaluation of hot slump prevention ability>> were performed according to the evaluation method described in <Evaluation> below. These evaluation results are shown in Tables 1 to 6.

<Evaluation>

<<Evaluation of Temperature Cycle Reliability>>

(1) Evaluation Method

A printed circuit board (material: FR-4, thickness: 1.0 mm, land dimension: 1.5 mm×0.25 mm, pitch: 0.5 mm, width between lands: 0.25 mm, number of lands: 64) was prepared. The prepared solder paste was printed on the printed circuit board using a metal mask having a thickness of 150 m.

Subsequently, using the printed board after printing, reflow soldering was performed to obtain a test board. The reflow profile is shown in FIG. 1. In the reflow profile, the pre-heating was performed at 150° C. to 180° C. for 90 seconds, the peak temperature was 240° C., and the solder melting time was 40 seconds. The reflow was performed in a nitrogen atmosphere, and the oxygen concentration was 1,000 ppm or less.

Subsequently, each test board thus obtained was put in a heat cycle tester and subjected to 3,000 cycles with standing at a low temperature (−40° C.) and at a high temperature (125° C.) as one cycle. In this cycle, the standing times at the low temperature and the high temperature were both 30 minutes, and the time for one cycle was set to 70 minutes. Cracking of the flux residue was observed after performing 3,000 cycles. Temperature cycle reliability was evaluated according to the following determination criteria.

(2) Determination Criteria

A: No cracks were confirmed at any point.

B: A crack of less than 0.125 mm was confirmed in the flux residue between the lands.

C: A crack of 0.125 mm or more was confirmed in the flux residue between the lands.

D: A crack crossing the flux residue between the lands was confirmed.

The flux with an evaluation result of A or B was regarded as acceptable, and the flux with an evaluation result of C or D was regarded as unacceptable.

<<Evaluation of Solder Paste Separation Prevention Ability>>

(1) Evaluation Method 500 g of the prepared solder paste was put in a container and left to stand in a constant-temperature tank at 40° C. for 3 days. After a lapse of the following predetermined time, the solder paste was visually observed to determine whether or not the solder paste was separated according to the following criteria.

(2) Determination Criteria

A: The solder paste was not separated after a lapse of 72 hours.

B: The solder paste was not separated after a lapse of 48 hours. The paste separated after a lapse of longer than 48 hours and shorter than 72 hours.

C: The solder paste was not separated after a lapse of 12 hours. The solder paste separated after a lapse of longer than 12 hours and shorter than 48 hours.

D: The solder paste separated after a lapse of shorter than 12 hours.

The flux with an evaluation result of A, B, or C was regarded as acceptable, and the flux with an evaluation result of D was regarded as unacceptable.

<<Evaluation of Shear Strength>>

(1) Evaluation Method

For a resist layer on the board (SMIC017-02 ver.3), 1 mL of the prepared flux was applied to the resist surface using a mask (SMIC017-02 ver.3, thickness 0.12 mm), and thereafter reflow was performed. The reflow temperature profile was set to be the same as in <<Evaluation of temperature cycle reliability>>. The reflow was performed in a nitrogen atmosphere, and the oxygen concentration was set to 3,000 ppm or less.

Subsequently, about 0.1 mL of an underfill was applied on the flux residue. As the underfill, UF3810 (manufactured by Loctite) was used.

Subsequently, a chip (2012CC) was mounted on the underfill and put in a constant-temperature tank to be cured. Curing conditions were 130° C. for 8 minutes. In this curing step, the underfill and the flux were mixed and cured.

Subsequently, the load was set to 50 kgf, the shear speed was set to 6.0 mm/min, and the height was set to 1.0 mm to measure the shear strength which was determined according to the following criteria. Herein, 1 [kgf]=9.8 [N].

(2) Determination Criteria

A: The shear strength was 20 N or more.

B: The shear strength was equal to or more than 10 N and less than 20 N.

C: The shear strength was less than 10 N.

The flux with an evaluation result of A or B was regarded as acceptable, and the flux with an evaluation result of C was regarded as unacceptable.

<<Evaluation of Hot Slump Prevention Ability>>

(1) Evaluation Method

Figure 2:
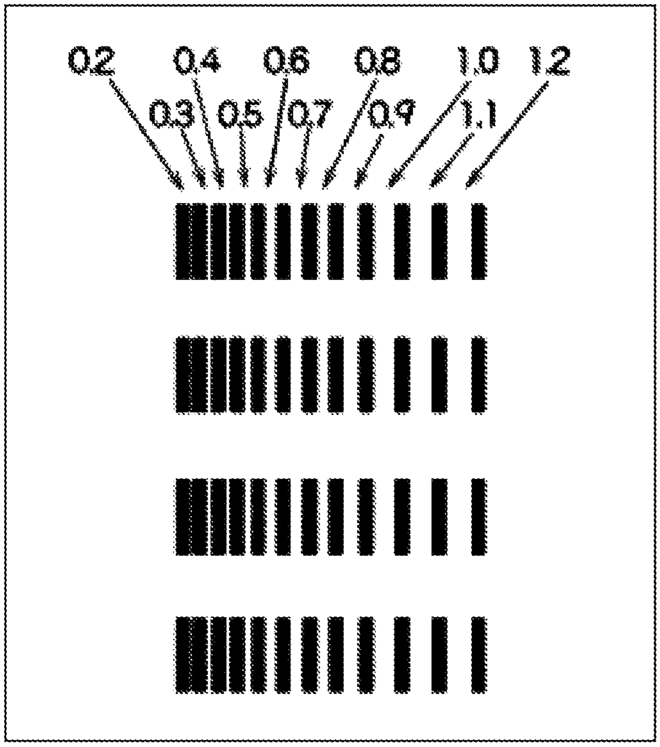
FIG. 2 is a diagram schematically showing pattern holes of 1 in the evaluation of a hot slump prevention ability.

Hot slump was evaluated for the prepared solder paste according to the method disclosed in JIS Z 3284-3:2014 "Test for slump during heating." First, the solder paste was printed using a metal mask with patterned holes shown in I (hole size 3.0×0.7) in FIG. 2 of the "Test for slump during heating" to obtain a test board. The obtained test board was left to stand in a constant-temperature tank at 150° C. for 3 minutes. FIG. 2 shows a schematic diagram of the pattern of 1 mentioned above. In FIG. 2, the numerical values from 0.2 to 1.2 represent the distances between pattern holes. For the test board after heating, the minimum interval at which all the printed solder pastes were not integrated was evaluated according to the following criteria.

(2) Determination Criteria

A: In the pattern of 1, the minimum interval was 0.3 mm or less.

B: In the pattern of 1, the minimum interval was more than 0.3 mm and equal to or less than 0.4 mm.

C: In the pattern of 1, the minimum interval was more than 0.4 mm.

The flux with an evaluation result of A or B was regarded as acceptable, and the flux with an evaluation result of C was regarded as unacceptable.

TABLE 1

| | | | Example 1 | Example 2 | Example 3 | Example 4 | Example 5 | Example 6 | Example 7 | Example 8 | Example 9 | Example 2 |
|---|---|---|---|---|---|---|---|---|---|---|---|---|
| Resin component | Co-polymer (A) | Ethylene-acrylic acid copolymer #1 | 10 | 15 | 15 | 20 | 10 | 10 | 15 | 15 | 20 | 30 |
| | | Ethylene-acrylic acid copolymer #2 | | | | | | | | | | |
| | Other resins | Polyacrylic acid ester homopolymer | | | | | | | | | | |
| | | Polyethylene homopolymer | | | | | | | | | | |
| | | Polybutadiene homopolymer | | | | | | | | | | |
| | Rosin (B) | Maleic acid-modified hydrogenated rosin | 2 | 2 | 2 | 2 | 1 | 4 | 4 | 4 | 4 | 4 |
| | | Hydrogenated rosin | | | | | 1 | | | | | |
| Solvent | | α-Terpineol | 10 | 10 | 10 | 10 | 10 | 10 | 10 | 10 | 10 | 10 |
| | | 2-Hexyl-1-decanol | | | | | | | | | | |
| | | Diethylene glycol mono-2-ethylhexyl ether | 42.5 | 37.5 | 34.5 | 32.5 | 42.5 | 40 | 35 | 36 | 30 | 20 |
| | | Tetraethylene glycol | 0.35 | 0.35 | 0.7 | 0.35 | 0.35 | 0.7 | 0.7 | | 0.7 | 0.7 |
| Activator | Organic acid | Malonic acid | 0.06 | 0.06 | 0.12 | 0.06 | 0.06 | 0.12 | 0.12 | 0.12 | 0.12 | 0.12 |
| | | Succinic acid | | | | | | | | | | |
| | | Glutaric acid | | | | | | | | | | |
| | | Adipic acid | 6 | 6 | 6 | 6 | 6 | 6 | 6 | 6 | 6 | 6 |
| | | Azclaic acid | 3 | 3 | 3 | 3 | 3 | 3 | 3 | 3 | 3 | 3 |
| | | Phenylsuccinic acid | 7 | 7 | 7 | 7 | 7 | 7 | 7 | 7 | 7 | 7 |
| | | Dimer acid | 10 | 10 | 10 | 10 | 10 | 10 | 10 | 10 | 10 | 10 |
| | Amine | Triethylenetetramine | 0.09 | 0.09 | 0.18 | 0.09 | 0.09 | 0.18 | 0.18 | 0.18 | 0.18 | 0.18 |
| | | Dipropylenetriamine | | | | | | | | | | |
| | | Monoethanolamine | | | | | | | | | | |
| | | Diethylethylene-diamine | | | | | | | | | | |
| | | Bis(2-ethyl-hexyl)amine | | | | | | | | | | |
| | | N,N,N',N'-tetrakis(2-hydroxypropyl-ethylenediamine | | | | | | | | | | |

TABLE 1-continued

| | | | Example 1 | Example 2 | Example 3 | Example 4 | Example 5 | Example 6 | Example 7 | Example 8 | Example 9 | Example 2 |
|---|---|---|---|---|---|---|---|---|---|---|---|---|
| | Azoles | 3-(N-salicyloyl)-amino-1,2,4-triazole | 0.5 | 0.5 | 0.5 | 0.5 | 0.5 | 0.5 | 0.5 | 0.5 | 0.5 | 0.5 |
| | | 2-Ethylimidazole | 4.5 | 4.5 | 4.5 | 4.5 | 4.5 | 4.5 | 4.5 | 4.5 | 4.5 | 4.5 |
| Thixotropic agent | | Hydrogenated castor oil | | | 2 | | | | | | | |
| Antioxidant | | 2,2'-Dihydroxy-3,3'-bis(α-methyl-cyclohexyl)-5,5'-dimethyldi-phenylmethane | 4 | 4 | 4 | 4 | 4 | 4 | 4 | 4 | 4 | 4 |
| Total | | | 100 | 100 | 100 | 100 | 100 | 100 | 100 | 100 | 100 | 100 |
| Total amount of copolymer (A)/total amount of rosin (B) | | | 5.00 | 7.50 | 7.50 | 10.00 | 5.00 | 2.50 | 3.75 | 3.75 | 5.00 | 7.50 |
| Evaluation | | Evaluation of temperature cycle reliability | A | A | A | A | A | A | A | A | A | A |
| | | Evaluation of solder paste separation prevention ability | A | A | A | A | A | B | A | A | A | A |
| | | Shear strength | A | A | B | A | A | A | A | A | A | A |
| | | Evaluation of hot slump prevention ability | A | A | A | A | A | A | A | A | A | A |

TABLE 2

| | | | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|---|---|
| Resin component | Co-polymer (A) | Ethylene-acrylic acid copolymer #1 | 15 | 15 | 15 | 15 | 15 | 15 | 15 | 15 | 15 | 15 | 15 |
| | | Ethylene-acrylic acid copolymer #2 | | | | | | | | | | | |
| | Other resins | Polyacrylic acid ester homopolymer | | | | | | | | | | | |
| | | Polyethylene homopolymer | | | | | | | | | | | |
| | | Polybutadiene homopolymer | | | | | | | | | | | |
| | Rosin (B) | Maleic acid-modified hydrogenated rosin | 2 | 4 | 4 | 4 | 4 | 4 | 4 | 4 | 4 | 4 | 4 |
| | | Hydrogenated rosin | 2 | | | | | | | | | | |
| Solvent | | α-Terpincol | 10 | 5 | 15 | 20 | | 10 | | 10 | 10 | 10 | 10 |
| | | 2-Hexyl-1-decanol | | | | | | | 10 | | | | |
| | | Diethylene glycol mono-2-ethylhexyl ether | 35 | 40.7 | 30.7 | 25.7 | 45 | 36 | 35 | 45 | 45 | 45 | 45 |
| | | Tetraethylene glycol | 0.7 | 0.21 | 0.21 | 0.21 | 0.7 | | 0.7 | 0.7 | 0.7 | 0.7 | 0.7 |
| Activator | Organic acid | Malonic acid | 0.12 | 0.04 | 0.04 | 0.04 | 0.12 | | 0.12 | 0.13 | | | |
| | | Succinic acid | | | | | | | | | | | |
| | | Glutaric acid | | | | | | | | | | | |
| | | Adipic acid | 6 | 6 | 6 | 6 | 6 | 6 | 6 | 6 | 6 | 6 | 6 |
| | | Azclaic acid | 3 | 3 | 3 | 3 | 3 | 3 | 3 | 3 | 3 | 3 | 3 |
| | | Phenylsuccinic acid | 7 | 7 | 7 | 7 | 7 | 7 | 7 | 7 | 7 | 7 | 7 |
| | | Dimer acid | 10 | 10 | 10 | 10 | 10 | 10 | 10 | | | | |
| | Aminc | Triethylenetetramine | 0.18 | 0.05 | 0.05 | 0.05 | 0.18 | | 0.18 | | 0.15 | | |
| | | Dipropylenetriamine | | | | | | | | 0.17 | | | |
| | | Monoethanolamine | | | | | | | | | | 0.08 | |
| | | Diethylethylene-diamine | | | | | | | | | | | 0.13 |
| | | Bis(2-ethyl-hexyl)amine | | | | | | | | | | | |
| | | N,N,N',N'-tetrakis(2-hydroxypropyl-ethylenediamine | | | | | | | | | | | |
| | Azoles | 3-(N-salicyloyl)-amino-1,2,4-triazole | 0.5 | 0.5 | 0.5 | 0.5 | 0.5 | 0.5 | 0.5 | 0.5 | 0.5 | 0.5 | 0.5 |
| | | 2-Ethylimidazole | 4.5 | 4.5 | 4.5 | 4.5 | 4.5 | 4.5 | 4.5 | 4.5 | 4.5 | 4.5 | 4.5 |
| Thixotropic agent | | Hydrogenated castor oil | | | | | | | | | | | |

TABLE 2-continued

| | | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|---|
| Antioxidant | 2,2'-Dihydroxy-3,3'-bis(α-methyl-cyclohexyl)-5,5'-dimethyldi-phenylmethane | 4 | 4 | 4 | 4 | 4 | 4 | 4 | 4 | 4 | 4 | 4 |
| Total | | 100 | 100 | 100 | 100 | 100 | 100 | 100 | 100 | 100 | 100 | 100 |
| Total amount of copolymer (A)/amount of rosin (B) | | 3.75 | 3.75 | 3.75 | 3.75 | 3.75 | 3.75 | 3.75 | 3.75 | 3.75 | 3.75 | 3.75 |
| Evaluation | Evaluation of temperature cycle reliability | A | A | A | A | A | A | A | A | A | A | A |
| | Evaluation of solder paste separation prevention ability | A | A | A | A | A | A | A | A | A | A | A |
| | Shear strength | A | A | A | A | A | A | A | A | A | A | A |
| | Evaluation of hot slump prevention ability | A | A | A | A | C | C | A | A | A | A | A |

TABLE 3

| | | | Example 22 | Example 23 | Example 24 | Example 25 | Example 26 | Example 27 | Example 28 | Example 29 | Example 30 |
|---|---|---|---|---|---|---|---|---|---|---|---|
| Resin component | Co-polymer (A) | Ethylene-acrylic acid copolymer #1 | 10 | 15 | 20 | 20 | 20 | 20 | 20 | 20 | 20 |
| | | Ethylene-acrylic acid copolymer #2 | | | | | | | | | |
| | Other resins | Polyacrylic acid ester homopolymer | | | | | | | | | |
| | | Polyethylene homopolymer | | | | | | | | | |
| | | Polybutadiene homopolymer | | | | | | | | | |
| | Rosin (B) | Maleic acid-modified hydrogenated rosin | 6 | 6 | 6 | 3 | 6 | 6 | 6 | 6 | 6 |
| | | Hydrogenated rosin | | | | 3 | | | | | |
| Solvent | | α-Terpineol | 10 | 10 | 10 | 10 | 10 | 10 | 10 | 10 | 10 |
| | | 2-Hexyl-1-decanol | | | | | | | | | |
| | | Diethylene glycol mono-2-ethylhexyl ether | 38 | 33 | 28 | 28 | 28 | 28 | 28 | 28 | 28 |
| | | Tetraethylene glycol | 0.7 | 0.7 | 0.7 | 0.7 | 0.7 | 0.7 | 0.7 | 0.7 | 0.7 |
| Activator | Organic acid | Malonic acid | 0.12 | 0.12 | 0.12 | 0.12 | 0.13 | 0.09 | 0.08 | | |
| | | Succinic acid | | | | | | | | 0.13 | |
| | | Glutaric acid | | | | | | | | | 0.14 |
| | | Adipic acid | 6 | 6 | 6 | 6 | 6 | 6 | 6 | 6 | 6 |
| | | Azclaic acid | 3 | 3 | 3 | 3 | 3 | 3 | 3 | 3 | 3 |
| | | Phenylsuccinic acid | 7 | 7 | 7 | 7 | 7 | 7 | 7 | 7 | 7 |
| | | Dimer acid | 10 | 10 | 10 | 10 | 10 | 10 | 10 | 10 | 10 |
| | Amine | Triethylenetetramine | 0.18 | 0.18 | 0.18 | 0.18 | | | | 0.17 | 0.16 |
| | | Dipropylenetriamine | | | | | 0.17 | | | | |
| | | Monoethanolamine | | | | | | | | | |
| | | Diethylethylene-diamine | | | | | | | | | |
| | | Bis(2-ethyl-hexyl)amine | | | | | | 0.21 | | | |
| | | N,N,N',N'-tetrakis(2-hydroxypropyl-ethylenediamine | | | | | | | 0.22 | | |
| | Azoles | 3-(N-salicyloyl)-amino-1,2,4-triazole | 0.5 | 0.5 | 0.5 | 0.5 | 0.5 | 0.5 | 0.5 | 0.5 | 0.5 |
| | | 2-Ethylimidazole | 4.5 | 4.5 | 4.5 | 4.5 | 4.5 | 4.5 | 4.5 | 4.5 | 4.5 |
| Thixotropic agent | | Hydrogenated castor oil | | | | | | | | | |
| Antioxidant | | 2,2'-Dihydroxy-3,3'-bis(α-methyl-cyclohexyl)-5,5'-dimethyldi-phenylmethane | 4 | 4 | 4 | 4 | 4 | 4 | 4 | 4 | 4 |

TABLE 3-continued

| | | Example 22 | Example 23 | Example 24 | Example 25 | Example 26 | Example 27 | Example 28 | Example 29 | Example 30 |
|---|---|---|---|---|---|---|---|---|---|---|
| Total | | 100 | 100 | 100 | 100 | 100 | 100 | 100 | 100 | 100 |
| Total amount of copolymer (A)/ total amount of rosin (B) | | 1.67 | 2.50 | 3.33 | 3.33 | 3.33 | 3.33 | 3.33 | 3.33 | 3.33 |
| Evaluation | Evaluation of temperature cycle reliability | B | A | A | A | A | A | A | A | A |
| | Evaluation of solder paste separation prevention ability | C | B | A | A | A | A | A | A | A |
| | Shear strength | A | A | A | A | A | A | A | A | A |
| | Evaluation of hot slump prevention ability | A | A | A | A | A | C | C | A | A |

TABLE 4

| | | | Example 31 | Example 32 | Example 33 | Example 34 | Example 35 | Example 36 | Example 37 |
|---|---|---|---|---|---|---|---|---|---|
| Resin component | Copolymer (A) | Ethylene-acrylic acid copolymer #1 | 20 | 20 | 20 | 20 | 20 | 20 | 20 |
| | | Ethylene- acrylic acid copolymer #2 | | | | | | | |
| | Other resins | Polyacrylic acid ester homopolymer | | | | | | | |
| | | Polyethylene homopolymer | | | | | | | |
| | | Polybutadiene homopolymer | | | | | | | |
| | Rosin (B) | Maleic acid-modified hydrogenated rosin | 6 | 6 | 6 | 6 | 6 | 6 | 6 |
| | | Hydrogenated rosin | | | | | | | |
| Solvent | | α-Terpineol | 10 | 10 | 10 | 10 | 10 | 10 | 10 |
| | | 2-Hexyl-1-decanol | | | | | | | |
| | | Diethylene glycol mono- 2-ethylhexyl ether | 34 | 37 | 35 | 34 | 34 | 34 | 37 |
| | | Tetraethylene glycol | 0.7 | 0.7 | 0.7 | 0.7 | 0.7 | 0.7 | 0.7 |
| Activator | Organic acid | Malonic acid | | | | 10 | | | |
| | | Succinic acid | | | | | 10 | | |
| | | Glutaric acid | | | | | | 10 | |
| | | Adipic acid | 0.15 | | 6 | | | | |
| | | Azelaic acid | 3 | 0.17 | 3 | | | | |
| | | Phenylsuccinic acid | 7 | 7 | 0.17 | | | | 7 |
| | | Dimer acid | 10 | 10 | 10 | 10 | 10 | 10 | 10 |
| | Amine | Triethylenetetramine | 0.15 | 0.13 | 0.13 | 0.18 | 0.17 | 0.16 | 0.18 |
| | | Dipropylenetriamine | | | | | | | |
| | | Monoethanolamine | | | | | | | |
| | | Diethylethylenediamine | | | | | | | |
| | | Bis(2-ethylhexyl)amine | | | | | | | |
| | | N,N,N',N'-tetrakis(2-hydroxypropyl-ethylenediamine | | | | | | | |
| | Azoles | 3-(N-salicyloyl)amino-1,2,4-triazole | 0.5 | 0.5 | 0.5 | 0.5 | 0.5 | 0.5 | 0.5 |
| | | 2-Ethylimidazole | 4.5 | 4.5 | 4.5 | 4.5 | 4.5 | 4.5 | 4.5 |
| Thixotropic agent | | Hydrogenated castor oil | | | | | | | |
| Antioxidant | | 2,2'-Dihydroxy-3,3'-bis (α-methylcyclohexyl)-5,5'-dimethyldiphenylmethane | 4 | 4 | 4 | 4 | 4 | 4 | 4 |
| Total | | | 100 | 100 | 100 | 100 | 100 | 100 | 100 |
| Total amount of copolymer (A)/ total amount of rosin (B) | | | 3.33 | 3.33 | 3.33 | 3.33 | 3.33 | 3.33 | 3.33 |
| Evaluation | | Evaluation of temperature cycle reliability | A | A | A | A | A | A | A |
| | | Evaluation of solder paste separation prevention ability | A | A | A | A | A | A | A |
| | | Shear strength | A | A | A | A | A | A | A |
| | | Evaluation of hot slump prevention ability | A | A | A | A | A | A | B |

TABLE 4-continued

| | Example 31 | Example 32 | Example 33 | Example 34 | Example 35 | Example 36 | Example 37 |
|---|---|---|---|---|---|---|---|
| | | | Example 38 | Example 39 | Example 40 | Example 41 | Example 42 |
| Resin component | Copolymer (A) | Ethylene-acrylic acid copolymer #1 | 20 | 20 | 20 | 20 | 20 |
| | | Ethylene- acrylic acid copolymer #2 | | | | | |
| | Other resins | Polyacrylic acid ester homopolymer | | | | | |
| | | Polyethylene homopolymer | | | | | |
| | | Polybutadiene homopolymer | | | | | |
| | Rosin (B) | Maleic acid-modified hydrogenated rosin | 6 | 6 | 6 | 6 | 6 |
| | | Hydrogenated rosin | | | | | |
| Solvent | | α-Terpineol | 10 | 10 | 10 | 10 | 10 |
| | | 2-Hexyl-1-decanol | | | | | |
| | | Diethylene glycol mono- 2-ethylhexyl ether | 37 | 37 | 37 | 37 | 37 |
| | | Tetraethylene glycol | 0.7 | 0.7 | 0.7 | 0.7 | 0.7 |
| Activator | Organic acid | Malonic acid | 0.06 | | | | |
| | | Succinic acid | | 0.07 | | | |
| | | Glutaric acid | | | 0.07 | | |
| | | Adipic acid | | | | 0.08 | |
| | | Azelaic acid | | | | | 0.08 |
| | | Phenylsuccinic acid | 7 | 7 | 7 | 7 | 7 |
| | | Dimer acid | 10 | 10 | 10 | 10 | 10 |
| | Amine | Triethylenetetramine | 0.09 | 0.08 | 0.08 | 0.08 | 0.07 |
| | | Dipropylenetriamine | | | | | |
| | | Monoethanolamine | | | | | |
| | | Diethylethylenediamine | | | | | |
| | | Bis(2-ethylhexyl)amine | | | | | |
| | | N,N,N',N'-tetrakis(2-hydroxypropyl-ethylenediamine | | | | | |
| | Azoles | 3-(N-salicyloyl)amino-1,2,4-triazole | 0.5 | 0.5 | 0.5 | 0.5 | 0.5 |
| | | 2-Ethylimidazole | 4.5 | 4.5 | 4.5 | 4.5 | 4.5 |
| Thixotropic agent | | Hydrogenated castor oil | | | | | |
| Antioxidant | | 2,2'-Dihydroxy-3,3'-bis (α-methylcyclohexyl)-5,5'-dimethyldiphenylmethane | 4 | 4 | 4 | 4 | 4 |
| Total | | | 100 | 100 | 100 | 100 | 100 |
| Total amount of copolymer (A)/ total amount of rosin (B) | | | 3.33 | 3.33 | 3.33 | 3.33 | 3.33 |
| Evaluation | | Evaluation of temperature cycle reliability | A | A | A | A | A |
| | | Evaluation of solder paste separation prevention ability | A | A | A | A | A |
| | | Shear strength | A | A | A | A | A |
| | | Evaluation of hot slump prevention ability | A | A | A | A | A |

TABLE 5

| | | | Example 43 | Example 44 | Example 45 | Example 46 | Example 47 | Example 48 | Example 49 | Example 50 | Example 51 | Example 52 | Example 53 |
|---|---|---|---|---|---|---|---|---|---|---|---|---|---|
| Resin com-ponent | Co-polymer (A) | Ethylene-acrylic acid copolymer #1 | 20 | 20 | 20 | 10 | 20 | 20 | | | | | 10 |
| | | Ethylene-acrylic acid copolymer #2 | | | | | | | 10 | 15 | 20 | 20 | 10 |
| | Other resins | Polyacrylic acid ester homopolymer | | | | | | | | | | | |
| | | Polyethylene homopolymer | | | | | | | | | | | |
| | | Polybutadiene homopolymer | | | | | | | | | | | |
| | Rosin | Maleic acid-modified | 6 | 6 | 6 | 10 | 10 | 5 | 6 | 6 | 6 | 3 | 6 |

TABLE 5-continued

| | | | Example 43 | Example 44 | Example 45 | Example 46 | Example 47 | Example 48 | Example 49 | Example 50 | Example 51 | Example 52 | Example 53 |
|---|---|---|---|---|---|---|---|---|---|---|---|---|---|
| | (B) | hydrogenated rosin | | | | | | | | | | | |
| | | Hydrogenated rosin | | | | | | 5 | | | | 3 | |
| Solvent | | α-Terpineol | 10 | 10 | 10 | 10 | 10 | 10 | 10 | 10 | 10 | 10 | 10 |
| | | 2-Hexyl-1-decanol | | | | | | | | | | | |
| | | Diethylene glycol mono-2-ethylhexyl ether | 37 | 37 | 37 | 34 | 24 | 24 | 38 | 33 | 28 | 28 | 28 |
| | | Tetraethylene glycol | 0.7 | 0.7 | 0.7 | 0.7 | 0.7 | 0.7 | 0.7 | 0.7 | 0.7 | 0.7 | 0.7 |
| Activator | Organic acid | Malonic acid | 0.07 | 0.09 | 0.07 | 0.12 | 0.12 | 0.12 | 0.12 | 0.12 | 0.12 | 0.12 | 0.12 |
| | | Succinic acid | | | | | | | | | | | |
| | | Glutaric acid | | | | | | | | | | | |
| | | Adipic acid | | | | 6 | 6 | 6 | 6 | 6 | 6 | 6 | 6 |
| | | Azelaic acid | | | | 3 | 3 | 3 | 3 | 3 | 3 | 3 | 3 |
| | | Phenylsuccinic acid | 7 | 7 | 7 | 7 | 7 | 7 | 7 | 7 | 7 | 7 | 7 |
| | | Dimer acid | 10 | 10 | 10 | 10 | 10 | 10 | 10 | 10 | 10 | 10 | 10 |
| | Amine | Triethylenetetramine | | | | 0.18 | 0.18 | 0.18 | 0.18 | 0.18 | 0.18 | 0.18 | 0.18 |
| | | Dipropy lenetriamine | 0.08 | | | | | | | | | | |
| | | Monoethanolamine | | 0.06 | | | | | | | | | |
| | | Diethylethylene-diamine | | | 0.08 | | | | | | | | |
| | | Bis(2-ethyl-hexyl)amine | | | | | | | | | | | |
| | | N,N,N',N'-tetrakis(2-hydroxypropyl-ethylenediamine | | | | | | | | | | | |
| | Azoles | 3-(N-salicyloyl)-amino-1,2,4-triazole | 0.5 | 0.5 | 0.5 | 0.5 | 0.5 | 0.5 | 0.5 | 0.5 | 0.5 | 0.5 | 0.5 |
| | | 2-Ethylimidazole | 4.5 | 4.5 | 4.5 | 4.5 | 4.5 | 4.5 | 4.5 | 4.5 | 4.5 | 4.5 | 4.5 |
| Thixotropic agent | | Hydrogenated castor oil | | | | | | | | | | | |
| Antioxidant | | 2,2'-Dihydroxy-3,3'-bis(α-methyl-cyclohexyl)-5,5'-dimethyldi-phenylmethane | 4 | 4 | 4 | 4 | 4 | 4 | 4 | 4 | 4 | 4 | 4 |
| Total | | | 100 | 100 | 100 | 100 | 100 | 100 | 100 | 100 | 100 | 100 | 100 |
| Total amount of copolymer (A)/ total amount of rosin (B) | | | 3.33 | 3.33 | 3.33 | 1.00 | 2.00 | 2.00 | 1.67 | 2.50 | 3.33 | 3.33 | 3.33 |
| Evaluation | | Evaluation of temperature cycle reliability | A | A | A | B | A | A | B | A | A | A | A |
| | | Evaluation of solder paste separation prevention ability | A | A | A | C | B | B | C | B | A | A | A |
| | | Shear strength | A | A | A | A | A | A | A | A | A | A | A |
| | | Evaluation of hot slump prevention ability | A | A | A | A | A | A | A | A | A | A | A |

TABLE 6

| | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|---|---|---|---|---|
| Resin component | Copolymer (A) | Ethylene-acrylic acid copolymer #1 | 5 | 4 | | | | | | | | | | |
| | | Ethylene-acrylic acid copolymer #2 | | | | | | | | | | | | |
| | Other resins | Polyacrylic acid ester homopolymer | | | | | 10 | 15 | 20 | | | | | 15 |
| | | Polyethylene homopolymer | | | 10 | | | | | 15 | 20 | | | |
| | | Polybutadiene homopolymer | | | | 10 | | | | | | 15 | 20 | |
| | Rosin (B) | Maleic acid-modified hydrogenated rosin | 10 | 10 | 6 | 6 | 6 | 6 | 6 | 6 | 6 | 6 | 6 | 2 |
| | | Hydrogenated rosin | | | | | | | | | | | | |
| Solvent | | α-Terpineol | 10 | 10 | 10 | 10 | 10 | 10 | 10 | 10 | 10 | 10 | 10 | 10 |
| | | 2-Hexyl-1-decanol | | | | | | | | | | | | |
| | | Diethylene glycol mono-2-ethylhexyl ether | 39 | 40 | 38 | 38 | 38 | 33 | 28 | 33 | 28 | 33 | 28 | 30.5 |
| | | Tetraethylene glycol | 0.7 | 0.7 | 0.7 | 0.7 | 0.7 | 0.7 | 0.7 | 0.7 | 0.7 | 0.7 | 0.7 | 0.7 |
| Activator | Organic acid | Malonic acid | 0.12 | 0.12 | 0.12 | 0.12 | 0.12 | 0.12 | 0.12 | 0.12 | 0.12 | 0.12 | 0.12 | 0.12 |
| | | Succinic acid | | | | | | | | | | | | |
| | | Glutaric acid | | | | | | | | | | | | |
| | | Adipic acid | 6 | 6 | 6 | 6 | 6 | 6 | 6 | 6 | 6 | 6 | 6 | 6 |
| | | Azclaic acid | 3 | 3 | 3 | 3 | 3 | 3 | 3 | 3 | 3 | 3 | 3 | 3 |
| | | Phenylsuccinic acid | 7 | 7 | 7 | 7 | 7 | 7 | 7 | 7 | 7 | 7 | 7 | 7 |
| | | Dimer acid | 10 | 10 | 10 | 10 | 10 | 10 | 10 | 10 | 10 | 10 | 10 | 10 |
| | Amine | Triethylenetetramine | 0.18 | 0.18 | 0.18 | 0.18 | 0.18 | 0.18 | 0.18 | 0.18 | 0.18 | 0.18 | 0.18 | 0.18 |
| | | Dipropylenetriamine | | | | | | | | | | | | |
| | | Monoethanolamine | | | | | | | | | | | | |
| | | Diethylethylenediamine | | | | | | | | | | | | |
| | | Bis(2-ethylhexyl)amine | | | | | | | | | | | | |
| | | N,N,N',N'-tetrakis(2-hydroxypropyl-ethylenediamine | | | | | | | | | | | | |
| | Azoles | 3-(N-salicyloyl)-amino-1,2,4-triazole | 0.5 | 0.5 | 0.5 | 0.5 | 0.5 | 0.5 | 0.5 | 0.5 | 0.5 | 0.5 | 0.5 | 0.5 |
| | | 2-Ethylimidazole | 4.5 | 4.5 | 4.5 | 4.5 | 4.5 | 4.5 | 4.5 | 4.5 | 4.5 | 4.5 | 4.5 | 4.5 |
| Thixotropic agent | | Hydrogenated castor oil | | | | | | | | | | | | 6 |
| Antioxidant | | 2,2'-Dihydroxy-3,3'-bis (α-methyl-cyclohexyl)-5,5'-dimethyldiphenylmethane | 4 | 4 | 4 | 4 | 4 | 4 | 4 | 4 | 4 | 4 | 4 | 4 |
| Total | | | 100 | 100 | 100 | 100 | 100 | 100 | 100 | 100 | 100 | 100 | 100 | 100 |
| Total amount of copolymer (A)/ total amount of rosin (B) | | | 0.50 | 0.40 | 0.00 | 0.00 | 0.00 | 0.00 | 0.00 | 0.00 | 0.00 | 0.00 | 0.00 | 0.00 |
| Evaluation | | Evaluation of temperature | C | D | C | C | B | A | A | B | B | B | B | A |

TABLE 6-continued

| | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|---|---|---|---|
| cycle reliability | | | | | | | | | | | | |
| Evaluation of solder paste separation prevention ability | C | D | D | D | D | D | D | D | D | D | D | A |
| Shear strength | A | A | A | A | A | A | A | A | A | A | A | C |
| Evaluation of hot slump prevention ability | A | A | A | A | A | A | A | A | A | A | A | A |

Regarding the flux of Comparative Example 6 which contained a polyacrylic acid ester homopolymer and no thixotropic agent, the evaluation of the temperature cycle reliability was A, but the evaluation of the solder paste separation prevention ability was D.

Regarding the flux of Comparative Example 12 which contained a polyacrylic acid ester homopolymer and had a thixotropic agent content of 6% by mass, the evaluation of the solder paste separation prevention ability was A, which was improvement, but the evaluation of the shear strength was C.

Regarding the fluxes of Comparative Examples 1 and 2 in which the mass ratio represented by the copolymer (A)/the rosin (B) was less than 1 and the thixotropic agent was not contained, the evaluation of the temperature cycle reliability was C or D, and the evaluation of the solder paste separation prevention ability was C or D.

Regarding the flux of Example 1 in which the mass ratio represented by the copolymer (A)/the rosin (B) was 1 or more and the thixotropic agent was not contained, the evaluation of the temperature cycle reliability was A, and the evaluation of the solder paste separation prevention ability was also A.

In other words, when the mass ratio represented by the copolymer (A)/the rosin (B) was 1 or more, even without incorporation of the thixotropic agent, the temperature cycle reliability was improved, and the solder paste separation prevention ability was improved.

Regarding the fluxes of Comparative Examples 1 and 2 in which the mass ratio represented by the copolymer (A)/the rosin (B) was less than 1, the evaluation of the temperature cycle reliability was C or D.

On the other hand, regarding the fluxes of Examples 22, 46, and 49 in which the mass ratio was equal to or more than 1 and less than 2, the evaluation of the temperature cycle reliability was B.

Regarding the fluxes of Examples 1 to 21, 23 to 45, 47 to 48, and 50 to 53 in which the mass ratio was 2 or more, the evaluation of the temperature cycle reliability was A.

Regarding the fluxes of Comparative Examples 3 to 11 which did not contain the copolymer (A) and the thixotropic agent, the evaluation of the solder paste separation prevention ability was D.

Regarding the flux of Comparative Example 12 which did not contain the copolymer (A) and contained 6% by mass of the thixotropic agent, the evaluation of the solder paste separation prevention ability was A.

Regarding the fluxes of Examples 22, 46, and 49 in which the thixotropic agent was not contained and the mass ratio represented by the copolymer (A)/the rosin (B) was equal to or more than 1 and less than 2, the evaluation of the solder paste separation prevention ability was C.

Furthermore, regarding the fluxes of Examples 6, 23, 47, 48, and 50 in which the mass ratio was equal to or more than 2 and less than 3, the evaluation of the solder paste separation prevention ability was B.

Furthermore, regarding the fluxes of Examples 1 to 5, 7 to 21, 24 to 45, and 51 to 53 in which the mass ratio was 3 or more, the evaluation of the solder paste separation prevention ability was A.

In other words, it was confirmed that even when the content of the thixotropic agent was low or the thixotropic agent was not contained, when the mass ratio represented by the copolymer (A)/the rosin (B) was 1 or more, the solder paste separation prevention ability was improved. Furthermore, it was confirmed that the larger the mass ratio, the more the solder paste separation prevention ability is improved.

Regarding the flux of Comparative Example 12 in which the content of the thixotropic agent was 6% by mass, the evaluation of the shear strength was C.

Regarding the flux of Example 3 in which the content of the thixotropic agent was 2% by mass, the evaluation of the shear strength B.

Regarding the fluxes of Examples 1 to 2 and 4 to 53 in which the thixotropic agent was not contained, the evaluation of the shear strength was A.

In other words, it was confirmed that when the mass ratio represented by the copolymer (A)/the rosin (B) was 1 or more, the solder paste separation prevention ability and the shear strength maintenance could be compatible. Furthermore, it was confirmed that even when the thixotropic agent was not contained, the solder paste separation prevention ability was improved.

Regarding the flux of Example 15 in which the solvent having a dielectric constant of 4 or less was not contained, the evaluation of the hot slump prevention ability was C.

Regarding the fluxes of Examples 16, 27, and 28 in which the compound represented by General Formula (2) was not contained, the evaluation of the hot slump prevention ability was C.

Regarding the flux of Example 37 which contained the compound represented by General Formula (2) and phenylsuccinic acid, the evaluation of the hot slump prevention ability was B.

In other words, by further incorporating the specific amine represented by General Formula (2), the hot slump prevention ability was improved.

Regarding the fluxed of Examples 1 to 14, 17 to 26, 29 to 36, and 38 to 53, and Comparative Examples 1 to 12 which contained the compound represented by General Formula (2) and one or more selected from the group consisting of malonic acid, succinic acid, glutaric acid, adipic acid, and azelaic acid, the evaluation of the hot slump prevention ability was A.

In other words, according to the flux of the present invention, since the mass ratio represented by the copolymer (A)/the rosin (B) is 1 or more, cracking of the flux residue due to temperature changes can be reduced, and the separation of the solder paste into the solder powder and the flux over time can also be prevented at the time of storage. In addition, a decrease in soldering strength can be prevented when the underfill is used. According to the flux of the present invention, the above-mentioned effects can be exhibited even when the content of the thixotropic agent is low.

The flux and the solder paste of the present invention are suitably used for soldering of semiconductors that operate at high temperatures.

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

What is claimed is:

1. A solder paste comprising:

a solder alloy powder and a flux, wherein the flux comprising:

a resin component;

an activator; and a solvent, wherein the resin component contains a copolymer (A) having an alkene-derived repeating unit (a1), and an acrylic acid-derived repeating unit (a2) in which a hydrogen atom bonded to a carbon atom at an α-position may be substituted with a substituent, and a rosin (B), a mixing ratio of the copolymer (A) and the rosin (B) is 2 or more as a mass ratio represented by copolymer (A)/rosin (B), regarding the solder paste, an evaluation of temperature cycle reliability is A, and regarding the solder paste, an evaluation of solder paste separation prevention ability is A or B, wherein the evaluation of the temperature cycle reliability is determined by preparing a printed circuit board, regarding the printed circuit board, thickness is 1.0 mm, land dimension is 1.5 mm×0.25 mm, pitch is 0.5 mm, width between lands is 0.25 mm, number of the lands is 64, printing the solder paste on the printed circuit board using a metal mask having a thickness of 150 μm, obtaining a test board by performing reflow soldering to the printed circuit board after printing the solder paste, in the reflow profile, the pre-heating is performed at 150° C. to 180° C. for 90 seconds, the peak temperature is 240° C., and the solder melting time is 40 seconds, the reflow is performed in a nitrogen atmosphere, and the oxygen concentration is 1,000 ppm or less, putting the obtained test board in a heat cycle tester and subjecting the obtained test board to 3,000 cycles with standing at a low temperature of −40° C. and at a high temperature of 125° C. as one cycle, the standing times at the low temperature and the high temperature are both 30 minutes, and the time for one cycle is set to 70 minutes, observing cracking of the flux residue after performing 3,000 cycles, and evaluating the temperature cycle reliability as A when no cracks are confirmed at any point, wherein the evaluation of the solder paste separation prevention ability is determined by putting 500 g of the solder paste in a container and left to stand in a constant-temperature tank at 40° C. for 3 days, after a lapse of the following predetermined time, visually observing the solder paste to determine whether or not the solder paste is separated according to the following criteria, evaluating the solder paste separation prevention ability as A when the solder paste is not separated after a lapse of 72 hours, and evaluating the solder paste separation prevention ability as B when the solder paste is not separated after a lapse of 48 hours and the solder paste is separated after a lapse of longer than 48 hours and shorter than 72 hours.

2. The solder paste according to claim 1, wherein a content of the repeating unit (a2) in the copolymer (A) is 3% by mass or more with respect to a total mass of the copolymer (A).

3. The solder paste according to claim 2, further comprising:

a compound represented by General Formula (2), $$R^{21}—NH_2 \quad (2)$$

in the formula, $R^{21}$ represents an organic group.

4. The solder paste according to claim 3, wherein the compound represented by General Formula (2) is one or more selected from the group consisting of monoethanolamine, triethylenetetramine, and dipropylenetriamine.

5. The solder paste according to claim 3, further comprising:

a compound represented by General Formula (3), (3)

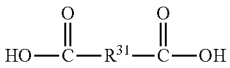

in the formula, $R^{31}$ represents an organic group or a single bond.

6. The solder paste according to claim 5, wherein the compound represented by General Formula (3) is one or more selected from the group consisting of malonic acid, succinic acid, glutaric acid, adipic acid, and azelaic acid.

7. The solder paste according to claim 1, wherein a content of the copolymer (A) is 5% by mass or more and 50% by mass or less with respect to a total mass of the flux.

8. The solder paste according to claim 1, wherein a content of the rosin (B) is 1% by mass or more and 20% by mass or less with respect to a total mass of the flux.

9. The solder paste according to claim 1, wherein a dielectric constant of the solvent is 4 or less.

10. The solder paste according to claim 9, wherein the solvent is one or more selected from the group consisting of α-terpineol and 2-hexyl-1-decanol.

11. The solder paste according to claim 1, further comprising:

a thixotropic agent, wherein a content of the thixotropic agent is more than 0% by mass and equal to or less than 2% by mass with respect to a total mass of the flux.

12. The solder paste according to claim 1, wherein a thixotropic agent is not contained.

* * * * *